US011739961B2

(12) United States Patent
Hatton et al.

(10) Patent No.: US 11,739,961 B2
(45) Date of Patent: Aug. 29, 2023

(54) VAPOR MITIGATION SYSTEM, VAPOR MITIGATION CONTROLLER AND METHODS OF CONTROLLING, MONITORING AND MITIGATING VAPORS

(71) Applicant: Vapor Dynamics LLC, Blairstown, NJ (US)

(72) Inventors: Thomas E. Hatton, Blairstown, NJ (US); Michael D. Salcone, Newtown, NJ (US)

(73) Assignee: Vapor Dynamics LLC, Blairstown, NJ (US)

( * ) Notice: Subject to any disclaimer, the term of this patent is extended or adjusted under 35 U.S.C. 154(b) by 452 days.

(21) Appl. No.: 16/600,422

(22) Filed: Oct. 11, 2019

(65) Prior Publication Data
US 2020/0041150 A1 Feb. 6, 2020

Related U.S. Application Data

(63) Continuation of application No. 14/282,505, filed on May 20, 2014, now Pat. No. 10,480,803, which is a
(Continued)

(51) Int. Cl.
*F24F 11/30* (2018.01)
*F24F 7/06* (2006.01)
(Continued)

(52) U.S. Cl.
CPC .............. *F24F 11/30* (2018.01); *F24F 7/003* (2021.01); *F24F 7/06* (2013.01); *F24F 11/52* (2018.01);
(Continued)

(58) Field of Classification Search
CPC ........... F24F 11/0017; F24F 2011/0032; F24F 2011/003; F24F 2007/001; F24F 7/06;
(Continued)

(56) References Cited

U.S. PATENT DOCUMENTS

| 4,843,786 A | 7/1989 | Walkinshaw et al. |
| 4,905,579 A | 3/1990 | Dame |

(Continued)

FOREIGN PATENT DOCUMENTS

EP 1653008 5/2006

OTHER PUBLICATIONS

"Vapor Mitigation System, Vapor Mitigation Controller and Methods of Controlling Vapors" Specification, Drawings, and Prosecution History of U.S. Appl. No. 14/160,060, filed Jan. 21, 2014, by Thomas E. Hatton, et al.
(Continued)

*Primary Examiner* — Avinash A Savani
*Assistant Examiner* — Dana K Tighe
(74) *Attorney, Agent, or Firm* — Moore & Van Allen PLLC; Michael M. McCraw

(57) ABSTRACT

A vapor management system includes a monitoring service system configured to communicate one or more system parameters with at least one vapor mitigation system. The monitoring service system is further configured to generate a user interface. The user interface is configured to display and permit adjustment of the one or more system parameters.

11 Claims, 18 Drawing Sheets

Related U.S. Application Data continuation-in-part of application No. 13/529,864, filed on Jun. 21, 2012, now Pat. No. 8,939,825.

(60) Provisional application No. 61/825,792, filed on May 21, 2013, provisional application No. 61/502,346, filed on Jun. 29, 2011, provisional application No. 61/499,672, filed on Jun. 21, 2011.

(51) Int. Cl.
| | |
|---|---|
| *F24F 11/52* | (2018.01) |
| *F24F 7/003* | (2021.01) |
| *F24F 7/00* | (2021.01) |
| *F24F 110/50* | (2018.01) |
| *F24F 110/66* | (2018.01) |
| *F24F 110/68* | (2018.01) |
| *F24F 11/00* | (2018.01) |

(52) U.S. Cl.
CPC ... *F24F 2007/001* (2013.01); *F24F 2007/004* (2013.01); *F24F 2011/0005* (2013.01); *F24F 2110/50* (2018.01); *F24F 2110/66* (2018.01); *F24F 2110/68* (2018.01)

(58) Field of Classification Search
CPC ...... F24F 11/30; F24F 11/52; F24F 2007/004; F24F 2110/50; F24F 2110/66; F24F 2110/68; F24F 2110/0005; Y02B 30/78; Y10S 454/909
USPC ....... 454/248, 340, 341, 344, 354, 370, 909; 406/12; 236/44 A
See application file for complete search history.

(56) References Cited

U.S. PATENT DOCUMENTS

| | | | |
|---|---|---|---|
| 5,131,887 A | 7/1992 | Traudt | |
| 5,197,862 A * | 3/1993 | Kladder | E02D 31/008 417/53 |
| 5,438,324 A * | 8/1995 | Chyi | A62B 11/00 340/309.8 |
| 5,810,657 A | 9/1998 | Pariseau | |
| 6,481,635 B2 | 11/2002 | Riley et al. | |
| 6,706,096 B2 | 3/2004 | Sanglerat et al. | |
| 6,906,810 B2 | 6/2005 | Senay et al. | |
| 7,275,533 B2 * | 10/2007 | Soeholm | F23N 5/18 126/299 R |
| 7,347,112 B2 | 3/2008 | Kay | |
| 7,414,525 B2 | 8/2008 | Costea et al. | |
| 7,632,178 B2 | 12/2009 | Meneely et al. | |
| 7,747,450 B2 | 6/2010 | Wenzlau et al. | |
| 7,873,524 B2 | 1/2011 | Wenzlau et al. | |
| 2005/0241417 A1 | 11/2005 | Kay | |
| 2009/0065596 A1 | 3/2009 | Seem et al. | |
| 2009/0281677 A1 * | 11/2009 | Botich | G06Q 30/0283 700/295 |
| 2010/0076606 A1 * | 3/2010 | Gatley | F04D 27/004 700/282 |
| 2010/0273121 A1 | 10/2010 | Gleason et al. | |
| 2012/0223833 A1 | 9/2012 | Thomas et al. | |
| 2014/0337240 A1 | 11/2014 | Wenzlau et al. | |

OTHER PUBLICATIONS

"High Vacuum, High Airflow Blower Testing and Design for Soil Vapor Intrusion Mitigation in Commercial Buildings" by William Brodhead and Thomas E. Hatton. (Sep. 2010).

"Evaluating Large Buildings and Assessing the Feasibility of Applying Active Soil Depressurization as a Remedial Solution for Vapor Intrusion" by Thomas E. Hatton, (Jan. 2009).

"Designing Efficient Sub Slab Venting and Vapor Barrier Systems for Schools and Large Buildings" by Thomas E. Hatton. (Oct. 2010).

"Vapor Mitigation System, Vapor Mitigation Controller and Methods of Controlling Vapors" Specification, Drawings, and Prosecution History of U.S. Appl. No. 13/529,864, filed Jun. 21, 2012, by Thomas E. Hatton, et al.

* cited by examiner

600

**Quarter 2 OM&M Report
For:
123 Any Street, Any Town, Any State**

Prepared for:

Mr. John Smith
123 Any Street
Any Town
Any State, 01234

Reviewed by:

Radon Mitigation Specialist or Engineer

Month Day, Year

FIG. 13A

Table of Contents

1. General System Information .................................................................... 3
2. Data Summary ........................................................................................ 3
   2.1. Blower Data ..................................................................................... 3
   2.2. Riser Data ........................................................................................ 4
      2.2.1. Riser #1 ..................................................................................... 4
      2.2.2. Riser #2 ..................................................................................... 4
      2.2.3. Riser #3 ..................................................................................... 5
   2.3. Sub Slab Data .................................................................................. 5
      2.3.1. Sub Slab Monitoring Port #1 .................................................... 5
      2.3.2. Sub Slab Monitoring Port #2 .................................................... 5
      2.3.3. Graph of Weekly Sub Slab Vacuum Levels ............................. 6
   2.4. Cost Savings from Dynamic Controls ............................................. 6
   2.5. Summary of Faults .......................................................................... 6

1. General System Information

The Sub Slab Depressurization (SSD), Vapor Intrusion Mitigation Systems (VIMS) located at 123 Any Street, Any Town, Any State is a single blower, 3 zone system. The system was commissioned on Month Day, Year under the management of XYZ LLC.

2. Data Summary

2.1. Blower Data

Blower Type: Cincinnati Fan 2 HP Radial Direct Drive

|  | Quarter #1 | Quarter #2 | Year to Date |
|---|---|---|---|
| Average Airflow (cfm): | 400 | 425 | 413 |
| Max Airflow (cfm): | 490 | 496 | 496 |
| Min Airflow (cfm): | 367 | 401 | 367 |
| Average Static Vacuum ("w.c.): | 8.4 | 8.15 | 8.21 |
| Max Static Vacuum ("w.c.): | 9.12 | 8.9 | 9.12 |
| Min Static Vacuum ("w.c.): | 7.34 | 7.9 | 7.34 |
| Average Current Draw (Amps): | 3.2 | 3.1 | 3.15 |
| Max Current Draw (Amps): | 4.0 | 3.9 | 4.0 |
| Min Current Draw (Amps): | 3.0 | 2.8 | 2.8 |
| Average Contaminant Exhausted (ppm): | 5 | 5 | 5 |
| Max Contaminant Exhausted (ppm): | 9 | 11 | 11 |
| Min Contaminant Exhausted (ppm): | 4 | 4 | 4 |

FIG. 13C 2.2. Riser Data 2.2.1. Riser #1

|  | Quarter #1 | Quarter #2 | Year to Date |
|---|---|---|---|
| Gate Valve Position (% open): | 100 | 100 | N/A |
| Average Airflow (cfm): | 150 | 159 | 154.5 |
| Max Airflow (cfm): | 160 | 163 | 163 |
| Min Airflow (cfm): | 148 | 152 | 148 |
| Average Vacuum ("w.c.): | 8.29 | 8.26 | 8.27 |
| Max Vacuum ("w.c.): | 8.60 | 8.30 | 8.6 |
| Min Vacuum ("w.c.): | 8.25 | 8.20 | 8.20 |

2.2.2. Riser #2

|  | Quarter #1 | Quarter #2 | Year to Date |
|---|---|---|---|
| Gate Valve Position (% open): | 100 | 100 | N/A |
| Average Airflow (cfm): | 140 | 143 | 142 |
| Max Airflow (cfm): | 156 | 151 | 156 |
| Min Airflow (cfm): | 126 | 130 | 126 |
| Average Vacuum ("w.c.): | 8.25 | 8.20 | 8.23 |
| Max Vacuum ("w.c.): | 9.10 | 8.90 | 9.10 |
| Min Vacuum ("w.c.): | 8.23 | 8.10 | 8.10 |

FIG. 13D

2.2.3. Riser #3

|  | Quarter #1 | Quarter #2 | Year to Date |
|---|---|---|---|
| Gate Valve Position (% open): | 75 | 75 | N/A |
| Average Airflow (cfm): | 100 | 111 | 106 |
| Max Airflow (cfm): | 140 | 129 | 140 |
| Min Airflow (cfm): | 94 | 86 | 86 |
| Average Vacuum ("w.c.): | 8.19 | 8.19 | 8.19 |
| Max Vacuum ("w.c.): | 9.30 | 8.72 | 9.30 |
| Min Vacuum ("w.c.): | 6.90 | 7.30 | 6.90 |

2.3. Sub Slab Data

*Upper Notification Limit: 0.0085 "w.c. Lower Notification Limit: 0.0075"w.c.*

2.3.1. Sub Slab Monitoring Port #1

|  | Quarter #1 | Quarter #2 | Year to Date |
|---|---|---|---|
| Set Point ("w.c.): | 0.0080 | 0.0080 | N/A |
| Average Vacuum ("w.c.): | 0.0081 | 0.0080 | 0.0080 |
| Max Vacuum ("w.c.): | 0.0084 | 0.0084 | 0.0084 |
| Min Vacuum ("w.c.): | 0.0078 | 0.0078 | 0.0078 |

2.3.2. Sub Slab Monitoring Port #2

|  | Quarter #1 | Quarter #2 | Year to Date |
|---|---|---|---|
| Set Point ("w.c.): | 0.0080 | 0.0080 | N/A |
| Average Vacuum ("w.c.): | 0.0079 | 0.0080 | 0.0080 |
| Max Vacuum ("w.c.): | 0.0085 | 0.0082 | 0.0086 |
| Min Vacuum ("w.c.): | 0.0079 | 0.0078 | 0.0076 |

FIG. 13E

2.3.3. Graph of Weekly Sub Slab Vacuum Levels

2.4. Cost Savings from Dynamic Controls

|  | Quarter #1 | Quarter #2 | Year to Date |
|---|---|---|---|
| Total Electrical Cost: | $427.30 | $398.26 | $825.90 |
| Estimated Money Saved: | $156.30 | $201.10 | $548.60 |

*Projected Annual Savings: $852.00*

2.5. Summary of Faults

No faults were recorded during quarters 1 and 2 of operation.

VAPOR MITIGATION SYSTEM, VAPOR MITIGATION CONTROLLER AND METHODS OF CONTROLLING, MONITORING AND MITIGATING VAPORS

RELATED APPLICATIONS

This application is a continuation of U.S. patent application Ser. No. 14/282,505, filed on May 20, 2014, which is a continuation-in-part of U.S. patent application Ser. No. 13/529,864, filed on Jun. 21, 2012 and issued as U.S. Pat. No. 8,939,825 on Jan. 27, 2015, which claims the benefit of U.S. Provisional Application No. 61/502,346, filed on Jun. 29, 2011, and U.S. Provisional Application No. 61/499,672, filed on Jun. 21, 2011, the contents of each application being incorporated herein by reference in their entirety. This application also claims the benefit of U.S. Provisional Application No. 61/825,792, filed on May 21, 2013, the contents of that application also being incorporated herein by reference in its entirety.

TECHNICAL FIELD

The present application generally relates to vapor mitigation systems, and more particularly, to dynamically controlled vapor mitigation systems, vapor mitigation controllers and methods of controlling, monitoring and mitigation vapors.

BACKGROUND

Vapor intrusion is a process by which chemicals (e.g., volatile organic compounds (VOCs), methane, radon, etc. . . . ) in soil and/or groundwater mitigate to or seep into building spaces. These vapors can be released from contaminated soil and/or groundwater underneath buildings, and may enter basements, crawl spaces, rooms and/or other areas of a building or structure. As a result of vapor intrusion, the air within buildings may become contaminated thereby exposing individuals within the buildings to chemical contamination, such as VOC and/or radon contamination.

Generally, VOCs are man-made chemical compounds that have a high vapor pressure and low water solubility. VOCs can be used and produced in the manufacture of fuels, paints, pharmaceuticals, and refrigerants, and are typically included in industrial solvents, paint thinners, tetrachoroethene (dry cleaning fluid), fuel oxygenates (MTBE), and by-products produced by chlorination in water treatment. VOC contaminants can travel with or on top of groundwater, and can easily become gaseous and migrate through soil. As a result of negative pressures that are induced by various building designs and features, VOCs can be drawn from the soil and/or groundwater, and into occupied spaces of buildings where human exposure can occur.

Radon is a Class A carcinogen that, according to scientific studies, can cause harmful effects on human lung tissue Like VOCs, radon can be drawn into buildings from the underlying soil and/or groundwater by the negative pressures that are associated with the structure and features of buildings. Negative pressure can be caused by factors such as: temperature differentials where warm air exits an upper portion of a building (induces a stack effect), and wind and exhaust appliances that create additional vacuum. These forces can draw in VOC and/or radon gases through cracks, conduit openings and other pathways in slabs, sub-slabs or other flooring features of buildings.

SUMMARY

Various systems and methods for reducing vapor contamination, such as VOCs and/or radon contamination, in buildings and structures are described herein. These system and methods may employ active and/or passive soil depressurization techniques to prevent VOC's, methane and/or radon contamination within structures and buildings. In some implementations, this can be accomplished by installing a vapor mitigation system that is constructed and arranged to prevent VOC's, methane and/or radon vapor from entering interior building spaces.

For example, some systems and methods described herein are configured to maintain a pre-specified pressure differential such as two pascals (0.008" w.c.) between the interior of the building and the underlying soil, crawl space or vapor barrier. This can be accomplished by configuring a vacuum controller to monitor one or more differential pressure sensors for sensing pressure between the interior of the building and the sub slab or floor. Based on the measured pressure, the vacuum controller can control the motor speed, riser pipe (vacuum pipe) gate valve position or HVAC supply to achieve specified pressure differentials. Sensor performance ranges can be monitored and adjusted on site or remotely over the Internet (via an Internet Interface).

Some systems and methods described herein are configured to control exhaust contaminant concentrations so as to not exceed predetermined quantities as set by State or Federal statute. This can be accomplished by configuring a vacuum controller to monitor mass airflow and contaminant sensors. Mass airflow indicates volume over time and contaminate concentrations, weight per volume such as ug/m3. These sensors can provide information to the vacuum controller, which can calculate the total contaminant exhausted, for example, in pounds per hour. Typically contaminant exhaust is regulated in pounds per year.

In some embodiments, the methods and systems induce a specified number of air changes per hour in the space between the floor and the soil of a building, such as in a building with an crawl space (e.g., inaccessible crawl space). Mass airflow sensors or individual riser pipes can provide information to calculate airflow volume which when combined with the entered volume of the area being depressurized would yield an air exchange rate. The vacuum controller can be configured to control the speed of the motor and or valves in riser pipes to ensure predetermined flow volumes. In cases where there is a high rate of air transfer between the occupied space and the sub floor, such as when there are multiple conduit penetrations, the HVAC system could be integrated to pressurize the occupied space and contribute to the pressure differential and volume of exhausted air. All sensor information can be data logged, monitored and controlled either on site or over the Internet. The vacuum controller can be further configured to regulate the motor speed and or valves in individual riser pipes to control the total volume of contaminate effluent. This information can be logged and made available on site over the internet. In some embodiments, motor speeds and riser valve positions could be adjusted remotely to maximize the overall efficiency of the system to maximize both in power conservation and contaminant removal.

In one aspect, a vapor mitigation system, comprises: at least one vacuum pipe constructed and arranged to collect vapors beneath a floor of a building and to vent the vapors;

a blower coupled to the at least one vacuum pipe, the blower constructed and arranged to create a vacuum under the floor of the building; and a controller configured to dynamically control a level of power supplied to the blower, wherein the controller adjusts the level of power supplied to the blower in response to one or more environmental measurements.

In some embodiments, the one or more environmental measurements are selected from the group consisting of: ambient temperature, building interior temperature, building exterior temperature, building sub-slab or floor temperature, building interior air pressure, building exterior air pressure, a level of vacuum created in the vacuum pipe, a level of vacuum created under the floor of the building, contaminant detection and blower mass air flow.

In some embodiments, the vapor mitigation system further comprises a vacuum sensor, wherein the vacuum sensor is constructed and arranged to determine a level of vacuum created under the floor of the building.

In some embodiments, the controller adjusts the level of power supplied to the blower in response to the level of vacuum.

In some embodiments, the controller increases the level of power supplied to the blower when the level of vacuum is less than a predetermined level.

In some embodiments, the controller decreases the level of power supplied to the blower when the level of vacuum is greater than a predetermined level.

In some embodiments, the predetermined level corresponds to regulatory discharge standards.

In some embodiments, the controller adjusts the level of power supplied to the blower so that the vacuum created under the floor of the building remains substantially constant.

In some embodiments, the controller is configured to adjust the level of power supplied to the blower so that the vacuum created under the floor of the building is maintained at a predetermined level.

In some embodiments, the controller is configured to adjust one or more parameters of an HVAC system.

In some embodiments, the one or more parameters are selected from the group consisting of: HVAC supply air pressure, ratio of building return air to fresh air input.

In some embodiments, the vapor mitigation system further comprises a monitoring system, wherein the monitoring system is configured to transmit a status of the vapor mitigation system to one or more host machines via the Internet.

In some embodiments, the vapor mitigation system further comprises a fresh air intake pipe constructed and arranged to allow dilution air to flow into an area beneath the floor of the building.

In some embodiments, the controller is configured to increase a level of power supplied to the blower in response to an increase in contaminant concentration beneath the floor of the building.

In some embodiments, the controller is configured to calculate a volume of dilution air drawn into the area beneath the floor of the building In some embodiments, the monitoring system is configured to receive system configuration parameters from a host machine via the Internet.

In another aspect, a method of mitigating vapors, comprises: generating an air flow within a passage so as to create a vacuum beneath a floor of a building; venting the air flow to an exterior of the building; and dynamically adjusting a level of the air flow in response to one or more environmental measurements.

In some embodiments, the one or more environmental measurements are selected from the group consisting of: ambient temperature, building interior temperature, building exterior temperature, building sub-slab or floor temperature, building interior air pressure, building exterior air pressure, barometric pressure, a level of vacuum created in the vacuum pipe, a level of vacuum created under the floor of the building, contaminant detection and blower mass air flow.

In some embodiments, the level of air flow is dynamically adjusted so that the vacuum created beneath the floor of the building remains substantially constant.

In another aspect, a vapor mitigation system, comprises: at least one vacuum pipe constructed and arranged to collect vapors beneath a floor of a building; a blower coupled to the at least one vacuum pipe, the blower constructed and arranged to create a vacuum under the floor of the building; a vacuum sensor configured to determine a level of vacuum under the floor of the building; and a controller configured to dynamically control a level of power supplied to the blower, wherein the controller adjusts the level of power supplied to the blower in response to the level of vacuum.

In some embodiments, the controller increases the level of power supplied to the blower when the level of vacuum is less than a predetermined level.

In some embodiments, the controller decreases the level of power supplied to the blower when the level of vacuum is greater than a predetermined level.

In some embodiments, the controller adjusts the level of power supplied to the blower so that the vacuum created under the floor of the building remains substantially constant.

In some embodiments, the controller is configured to adjust the level of power supplied to the blower so that the vacuum created under the floor of the building is maintained at a predetermined level.

In some embodiments, the controller is configured to transmit system parameters of the vapor mitigation system to a monitoring service system.

In some embodiments, the system parameters are selected from the group consisting of: mode of operation, gate valve position, airflow set points, vacuum set points, contaminant type, contaminant set points and/or blower current set points.

In some embodiments, the controller is configured to transmit performance measurements of the vapor mitigation system to a monitoring service system.

In some embodiments, the system parameters are selected from the group consisting of: blower current, main riser airflow, main riser vacuum pressure, main raiser contaminant type, main riser contaminant concentration, sub-riser airflow, sub-riser vacuum pressure, sub-riser contaminant type, sub-riser contaminant concentration, sub-slab vacuum pressure, energy consumption and environmental measurements.

In some embodiments, the vapor mitigation system further comprises: a fresh air intake pipe constructed and arranged to allow dilution air to flow into an area beneath the floor of the building, wherein the controller is configured to increase a level of power supplied to the blower in response to an increase in contaminant concentration beneath the floor of the building.

In another aspect, a vapor mitigation system, comprises: at least one vacuum pipe configured to collect vapors beneath a sub-slab of a building; a blower coupled to the at least one vacuum pipe for creating a negative pressure under the sub-slab of the building; and a controller configured to operate in one of an open-loop mode of operation and a close-loop mode of operation, wherein the controller is configured to cause a constant level of power to be supplied to the blower in the open-loop mode of operation, and wherein the controller is configured to adjust the level of power supplied to the blower in response to a sensor measurement in the closed-loop mode of operation.

In some embodiments, the sensor measurement is selected from the group consisting of: ambient temperature, building interior temperature, building exterior temperature, building sub-slab temperature, building interior air pressure, building exterior air pressure, barometric pressure, a level of negative pressure created under the floor of the building, contaminant detection and blower mass air flow.

In some embodiments, the controller increases the level of power supplied to the blower when the sensor measurement is less than a predetermined level.

In some embodiments, the controller decreases the level of power supplied to the blower when the sensor measurement is greater than a predetermined level.

In some embodiments, the controller adjusts the level of power supplied to the blower so that the sensor measurement remains substantially constant.

In some embodiments, the controller is configured to transmit system parameters of the vapor mitigation system to a monitoring service system.

In some embodiments, the system parameters are selected from the group consisting of: mode of operation, gate valve position, airflow set points, vacuum set points, contaminant type, contaminant set points and/or blower current set points.

In some embodiments, the controller is configured to transmit performance measurements of the vapor mitigation system to a monitoring service system.

In some embodiments, the system parameters are selected from the group consisting of: blower current, main riser airflow, main riser vacuum pressure, main riser contaminant type, main raiser contaminant concentration, sub-riser airflow, sub-raiser vacuum pressure, sub-raiser contaminant type, sub-raiser contaminant concentration, sub-slab vacuum pressure, energy consumption and environmental measurements.

In another aspect, a vapor management system, comprises: a monitoring service system configured to communicate one or more system parameters with at least one vapor mitigation system. The monitoring service system is further configured to generate a user interface, the user interface configured to display and permit adjustment of the one or more system parameters.

In some embodiments, the one or more system parameters are selected from the group consisting of: mode of operation, gate valve position, airflow set point, vacuum set point, contaminant type, contaminant set point, blower current set point, priority, and system performance value.

In some embodiments, the user interface is accessible via a client device.

In some embodiments, the one or more system parameters are adjustable at the client device via the user interface.

In some embodiments, the client device includes a browser facility for rendering the user interface.

In some embodiments, the monitoring service system is further configured to receive one or more system parameters from the client device and transmit the one or more system parameters to the at least one vapor mitigation system.

In some embodiments, the user interface is further configured to permit adjustment of one or more vacuum set points of the at least one vapor mitigation system.

In some embodiments, the monitoring service system is further configured to communicate one or more system performance measurements with the at least one vapor mitigation system.

In some embodiments, the one or more system performance measurements are selected from the group consisting of: blower current, main riser airflow, main riser vacuum pressure, main raiser contaminant type, main raiser contaminant concentration, sub-riser airflow, sub-riser vacuum pressure, sub-riser contaminant type, sub-riser contaminant concentration, sub-slab vacuum pressure, energy consumption, and environmental data.

In some embodiments, the monitoring service system communicates with the at least one vapor mitigation system through the Internet.

In some embodiments, the client device communicates with the monitoring service system through the Internet.

In some embodiments, the monitoring service system is a cloud computing resource.

In some embodiments, the monitoring service system is further configured to generate a performance report.

In some embodiments, the performance report includes at least a cover page, a table of contents page, and at least one page describing performance metrics of the at least one vapor mitigation system.

In some embodiments, the monitoring service system is further configured to monitor one or more system parameters of the at least one vapor mitigation system.

In some embodiments, the one or more system parameters are vacuum set points of the at least one vapor mitigation system.

In some embodiments, the monitoring service system is further configured to generate an alarm when the one or more system parameters are less than a predetermined level.

In some embodiments, the monitoring service system is further configured to generate an alarm when the one or more system parameters are greater than a predetermined level.

In some embodiments, the monitoring service system is further configured to monitor one or more system performance measures of the at least one vapor mitigation system.

In some embodiments, the monitoring service system is further configured to generate an alarm when the one or more system performance measures are less than a predetermined level.

In some embodiments, the monitoring service system is further configured to generate an alarm when the one or more system performance measures are greater than a predetermined level.

In some embodiments, the user interface includes a diagram illustrating the configuration of the at least one vapor mitigation system.

In some embodiments, the user interface includes a system selection interface area for selecting one of a plurality of vapor mitigation systems.

In some embodiments, the user interface displays a display area selected from the group consisting of: an environmental display area, a system operation selection interface area, an energy consumption and savings display area, a main riser display area, and a zone riser display area.

In another aspect, a vapor management system, comprises: a monitoring service system configured to receive one or more vacuum set points from at least one vapor mitigation system. The monitoring service system is further configured to receive an alarm notification parameter from the vapor mitigation system and generate an alarm notification when the one or more vacuum set points have passed a predetermined level.

In some embodiments, the monitoring service system is further configured to generate a user interface, the user interface configured to display and permit adjustment of the one or more vacuum set points.

In some embodiments, the alarm includes an email notification.

In another aspect, a method monitoring a vapor mitigation system, comprises: transmitting one or more system parameters to a vapor mitigation system; receiving an alarm notification parameter from the vapor mitigation system; and generating an alarm notification indicating that the one or more system parameters have passed a predetermined level.

In some embodiments, generating the alarm notification includes generating an email notification.

In some embodiments, the method further comprises displaying the one or more system parameters on a user interface.

In some embodiments, the method further comprises generating a performance metrics report.

In some embodiments, the method further comprises: receiving one or more system parameters from a client device; and transmitting the one or more system parameters to the at least one vapor mitigation system.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same elements throughout the different views. The drawings are not necessarily to scale, emphasis instead being placed upon illustrating the principles of the preferred embodiments.

FIGS. 13A-13F is an exemplary report describing performance metrics of a vapor mitigation system.

DETAILED DESCRIPTION OF EMBODIMENTS

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on" or "connected" or "coupled" to another element, it can be directly on or above, or connected or coupled to, the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

Figure 1:
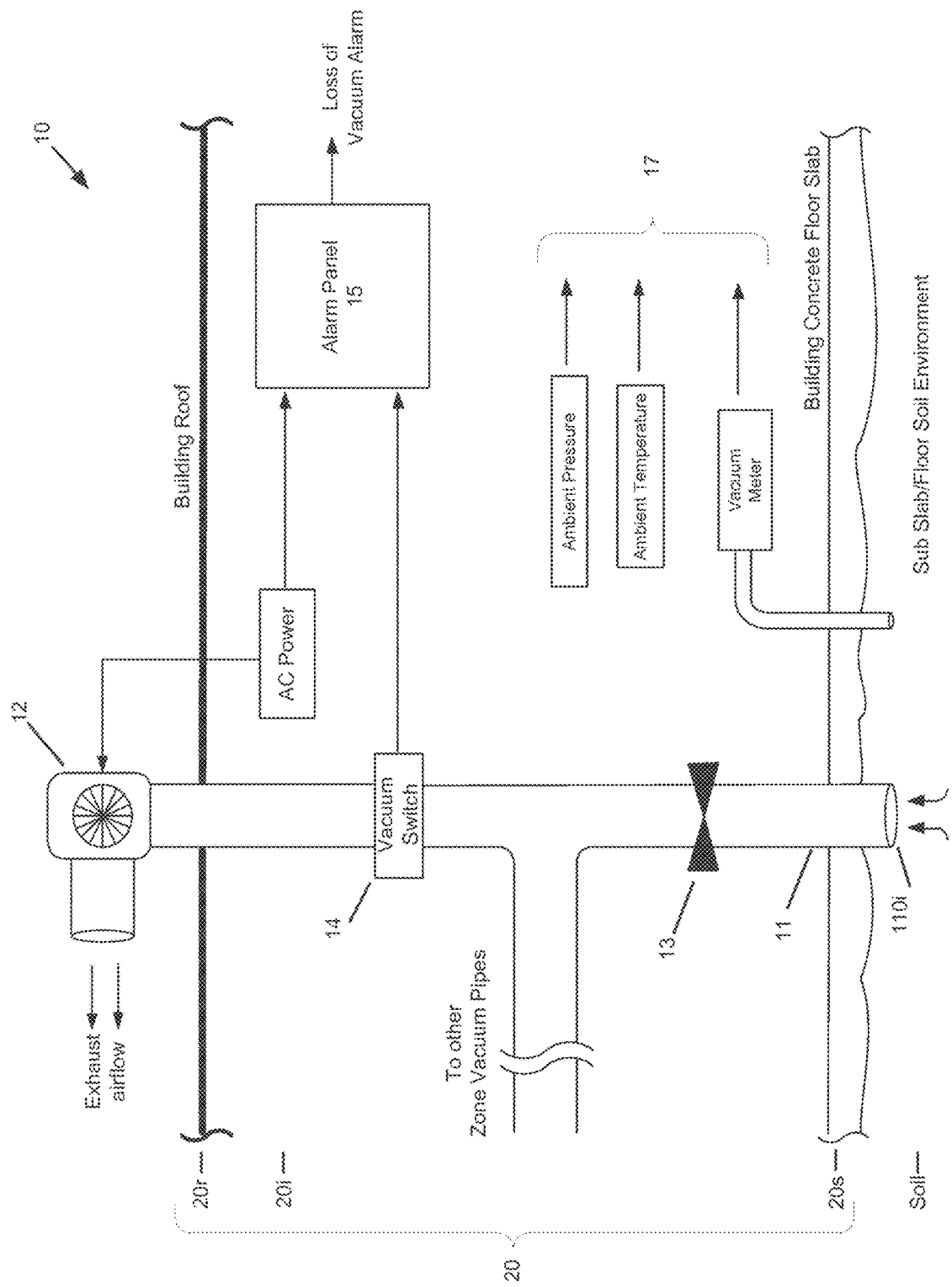
FIG. 1 is a block diagram of a vapor mitigation system.

FIG. 1 is a block diagram of a vapor mitigation system. A vapor mitigation system 10 can be installed and/or provided in a building or structure 20, and may comprise one or more vacuum pipes 11 and a constant power/speed blower 12. In this exemplary embodiment, the vapor mitigation system 10 is arranged to create a vacuum under the floor or building slab 20s (or vapor barrier) of the building 20 so as to collect VOC and/or radon vapors. The vapor mitigation system 10 is further arranged to vent an exhaust airflow of VOC's, methane and/or radon vapors above the building roof 20r.

In the vapor mitigation system 10 shown in FIG. 1, one or more vacuum pipes 11 are arranged to collect vapors beneath the floor or building slab 20s of the building 20. A first opening of the vacuum pipe 11 is positioned beneath the floor or building slab 20s and a second opening of the vacuum pipe 11 is coupled to a constant power/speed blower 12 so as to create a vacuum (negative pressure) under the floor or building slab 20s of the building 20.

The vapor mitigation system 10 is operated in an open-loop configuration—on or off. To setup the system 10, an installer makes a series of manual adjustments (i.e., air flow restriction) to the system 10 while collecting measurements at various levels of applied vacuum. The collected measurements 17 can include ambient pressure and temperature of the building interior 20i, vacuum pipe pressure (vacuum level) and building slab vacuum pressures. For example, in response to an initial collection of measurements, the level of applied vacuum pressure by the system 10 can be manually adjusted by opening or closing a gate valve 13, which is shown coupled between the first and second ends of the vacuum pipe 11. Further measurements and adjustments may be carried out by the installer to configure the system to apply an overwhelming vacuum pressure underneath the floor or building slab 20s of the building so as to compensate for various changes in building and environmental conditions. However, the restriction of air flow created by the closing of the gate valve 13 introduces energy inefficiencies into the system 10, since the blower 12 is operated at a constant speed/power. Accordingly, more power may be consumed by the constant power/speed blower 12 than is required to achieve the desired vacuum level.

Since the vapor mitigation system 10 is configured to apply an overwhelming vacuum pressure underneath the floor or building slab 20s of the building 20, the system 10 may consume more power than is required to properly ventilate vapors from beneath the floor or building slab 20s of the building 20. Pressures within the building interior 20i change due to wind loading and stack effect of appliances, such as HVAC systems, and environmental conditions, such as temperature, humidity, barometric pressure and wind speed/direction. Accordingly, the vapor mitigation system 10 is configured to apply an overwhelming vacuum underneath the floor or building slab 20s of the building 20 so that a minimum vacuum level is applied irrespective of changing building or environmental conditions.

Furthermore, changing environmental conditions, such as sub-slab moisture content and/or barometric fluctuations, can result in an excessive amount of vacuum being applied by the system 10. This can likewise introduce energy inefficiencies, and may require further design and calibration of the system 10 (which can introduce other economic inefficiencies).

The vapor mitigation system 10 may further comprise an alarm panel 15 and a vacuum switch 14, which is configured to detect the presence of an applied vacuum. In response to the binary detection of an applied vacuum, the alarm panel 15 can issue an on-site alarm if the vacuum pressure falls below a predetermined level.

Figure 2:
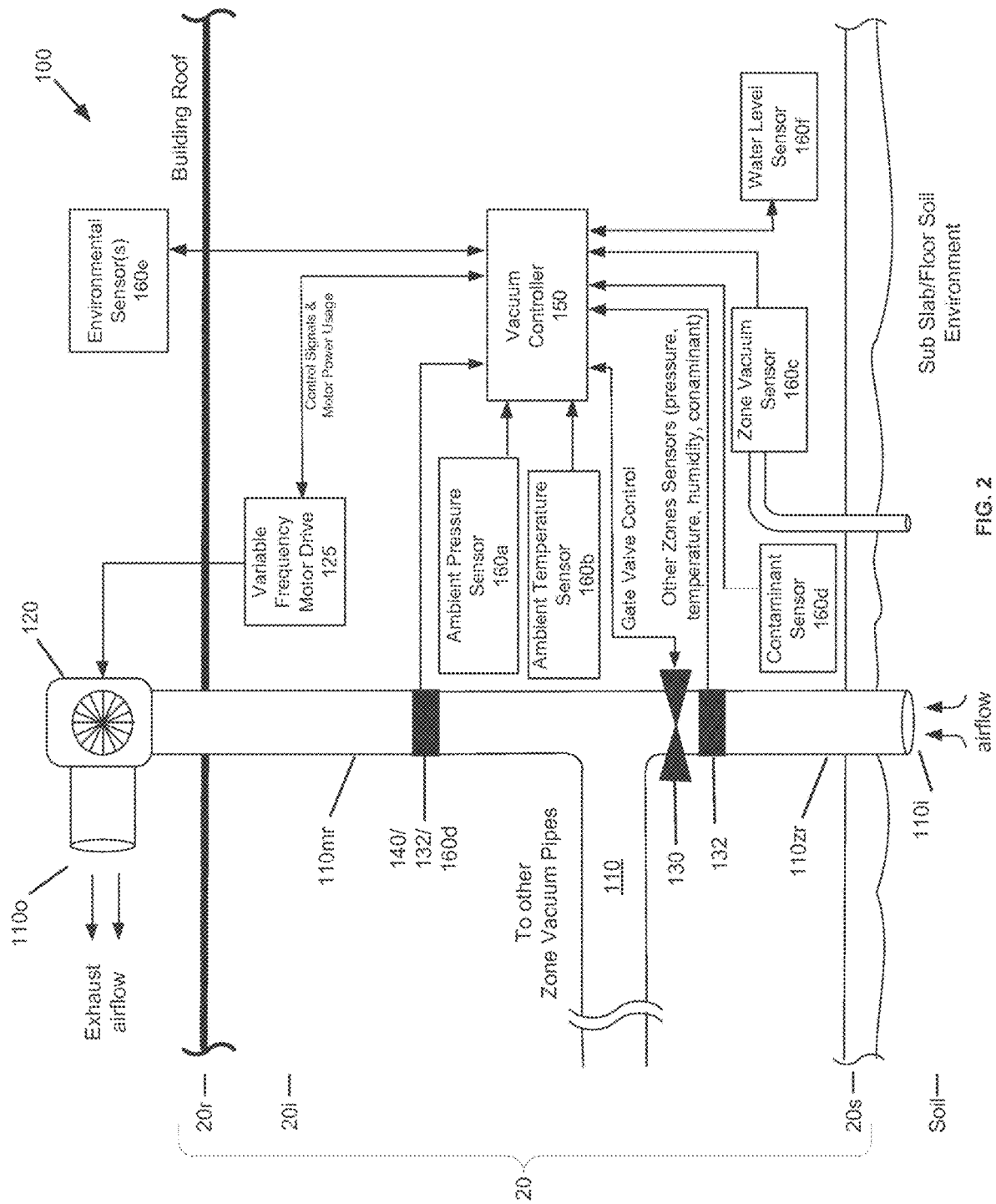
FIG. 2 is a block diagram of a dynamically controlled vapor mitigation system.

FIG. 2 is a block diagram of a dynamically controlled vapor mitigation system. A dynamically controlled vapor mitigation system 100 can be installed and/or provided in a building or structure 20, and may comprise one or more riser pipes or vacuum pipes 110, a vacuum controller 150 and a variable power/speed blower 120. The riser pipers or vacuum pipes 110 can be a single pipe or a plurality of connected pipes. The vapor mitigation system 100 may further include any of the above features or elements of the vapor mitigation system 10 described above with reference to FIG. 1.

The vapor mitigation system 100 is constructed and arranged to create a vacuum under a floor or building slab or vapor barrier 20s of a building 20 so as to collect VOCs, methane and/or radon vapors, and may be further be arranged to vent an exhaust airflow of VOCs, methane and/or radon vapors above the building roof 20r or other exterior location of the building 20. In the dynamically controlled vapor mitigation system 100 shown in FIG. 2, one or more vacuum pipes 110 are arranged to collect vapors beneath the floor or building slab 20s of the building 20. In some embodiments, a first opening of the vacuum pipe 110 is be positioned beneath the floor or building slab 20s and a second opening of the vacuum pipe 110 is coupled to a variable power/speed blower 120 so as to create a vacuum under the floor or building slab 20s of the building 20. Although not shown, a plurality of vacuum pipes 110 may be positioned to create the vacuum under the floor or building slab 20s of the building 20. For example, a plurality of vacuum pipes 110 and/or a single vacuum pipe having a plurality of vacuum pipe inlets 110i may be positioned to create vacuum zones (a first vacuum zone is shown in FIG. 2). In this manner, the dynamically controlled vapor mitigation system 100 can be arranged and/or configured to vent an exhaust airflow of VOC, methane and/or radon vapors above the building roof 20r or other exterior location of the building 20.

The vacuum controller 150 of the system 100 can include a microprocessor or other type of processing system that is configured to control and/or adjust the level of vacuum applied under the floor or building slab 20s of the building 20 in response to building and/or environmental measurements. These measurements may include, for example, ambient and/or interior pressure (ambient pressure sensor 160a), building interior air temperature (ambient temperature sensor 160b), building exterior air pressure, such as barometric pressure, building sub-slab or vapor pressure, or floor air pressure (zone vacuum sensor 160c), contaminant detection (contaminant sensor 160d), water table or groundwater level (water level sensor(s) 160f), vacuum pipe pressure (vacuum/pressure sensor 132) and/or zone exhaust mass air flow (mass air flow sensor 140).

In the present exemplary embodiment, the vacuum pipe(s) 110 includes a main riser pipe 110mr and a first zone riser pipe 110zr. A mass air flow sensor 140, a vacuum/pressure sensor 132 and a contaminant sensor 160d are coupled to the main riser pipe 110mr. The mass air flow sensor 140 coupled to the main riser pipe 110mr is configured to measure the airflow (e.g., cubic feet per minute) within the main riser pipe 110mr. The vacuum/pressure sensor 132 coupled to the main riser pipe 110mr is configured to measure the vacuum pressure (e.g., inches of water column) within the main riser pipe 110mr. The contaminant sensor 160d coupled to the main riser pipe 110mr is configured to measure the contaminant concentration (parts per million) within the main riser pipe 110mr.

In some embodiments, the system 100 may operate in a close-loop configuration such that the speed of the blower 120 is adjusted in response to a zone exhaust mass air flow measurement and/or other system measurement(s). For example, the zone exhaust mass air flow measurement can indicate that a large volume of air is exceeding the blower's 120 motor factor.

In response to the zone exhaust mass air flow measurement, the vacuum controller 150 may decrease the power/speed of the blower 120 so as not to exceed the blower's 120 motor factor. In addition, the zone exhaust mass air flow measurement may indicate a volume of contaminate removed from the sub slab or floor environment, which can trigger the vacuum controller 150 to increase or decrease the applied vacuum.

The vacuum controller 150 may be configured to vary the power applied to the blower 120 (so as to adjust the blower fan speed and applied vacuum) and/or to adjust the opening or closing of an electronically controlled gate valve 130 (optional) in response to the building and/or environmental measurements. For example, the vacuum controller 150 may be configured to regulate the air flow within the one or more vacuum pipes 110 (e.g., which can be sensed by the mass air flow sensor 140) so that various sub slab vacuum fields can be balanced and/or to apportion sub slab vacuum pressure to specific areas that have higher contaminant concentrations or Lower Explosive Limit (LEL), oxygen content or other contaminant extraction goals. A plurality of electronically controlled gate valves 130 may be provided so as to control applied vacuum pressures in embodiments having multiple air flow inlets 110*i*.

The vacuum controller 150 may be configured to vary the power applied to the blower 120 and/or to adjust the opening or closing of an electronically controlled gate valve 130 (optional) to control an amount of contaminants discharged into the atmosphere. For example, some States have permitable discharge standards that relate to annual gross pounds of contaminant discharged to the atmosphere. By measuring and collecting the contaminate concentrations and the discharge velocity of contaminants, the vacuum controller 150 may be configured to calculate a total contaminate discharge. Based on the total contaminate discharge, the vacuum controller 150 can reduce the power/speed of the blower 120 so that the amount of contaminant discharged into the atmosphere is reduced. In this manner, the system can be configured to reduce contaminant discharged so as not to exceed regulatory discharge standards.

The vacuum controller 150 can determine and control an optimum vacuum level to be applied under the floor or building slab 20*s*. Accordingly, energy efficiencies can be increased by monitoring the building and/or environmental measurements, and reducing the power/speed of the blower 120 when the vacuum applied under the floor or building slab 20*s* exceeds operating requirements. In addition, the controller 150 can increase the power/speed of the blower 120 if a high level of contaminants are detected within the building interior 20*i*.

The building and/or environmental measurements can be acquired via one or more sensors 140, 160*a-f* electronically coupled to the controller 120. For example, the sensors 140, 160*a-f* may be electrically coupled to the controller 120 via wires or cables (e.g., direct or indirect wired connections, network connections, etc. . . . ), or, additionally or alternatively, the sensors 140, 160*a-f* may be wirelessly coupled to the controller 120.

In some embodiments, the dynamically controlled vapor mitigation system 100 may include one or more of the following sensors: a mass air flow sensor 140, an ambient pressure sensor(s) 160*a* (interior and/or exterior building pressure sensors), an ambient temperature sensor(s) 160*b* (interior and/or exterior building pressure sensors), an inline zone vacuum sensor 160*c*, a contaminant sensor 160*d*, an environmental sensor 160*e*, and a water level sensor 160*f*. The mass air flow sensor 140 may be coupled to the one or more vacuum pipes 110, between an airflow inlet 110*i* and an airflow outlet 110o. The ambient temperature sensor(s) 160*b* and ambient pressure sensor(s) 160*a* may be provide within the building interior 20*i*, exterior to the building, and or beneath the building floor or slab 20*s*. The data from the pressure sensors 160*a* processed by the vacuum controller 150 to determine interior/exterior/sub floor differential pressures. The contaminant sensor 160*d* may be provided within the interior of the building so that a level of chemical contamination can be monitored; however, alternatively or additionally, the contaminant sensor 160*d* may be coupled to or provided within the vacuum pipes or beneath the floor slab 20*s* so that contaminant content drawn from specific vacuum zones can be measured. The environmental sensor(s) 160*e* may be provided at the exterior of the building, and may be constructed and arranged to measure temperature, humidity, barometric pressure, wind speed and wind direction. The water level sensor(s) 160*f* may be provided within the interior of the building so that a water level(s) below the floor slab can be monitored; however, alternatively or additionally, the water level sensor(s) 160*f* may be coupled to or provided outside of the building so that various water or moisture levels can be measured to produce an integrated image of water levels that can indicate general elevation or direction of flow toward or away from the zone(s) that are controlled by a vapor system.

During operation of the system 100, the vacuum controller 150 may be configured to provide a blower motor power/speed command to a variable frequency motor drive controller 125. In response to the blower motor power/speed command, the variable frequency motor drive controller 125 adjusts a power output supplied to the blower 120, which in turn affects the speed of the blower 120 and the level of applied vacuum. In addition, the vacuum controller 150 may provide a gate valve command to the electronically controlled gate valve 130 (if used). In this manner, the vacuum controller 150 can be configured to maintain a predetermined and/or constant sub floor vacuum level when other conditions, such as environmental and/or building conditions, change. For example, changes in soil moisture, stack effect, wind loading and seasonal atmospheric conditions my affect the floor vacuum level or contaminant concentrations. Accordingly, the system 100 can be more economical to operate since only the required level of vacuum is created.

Figure 3:
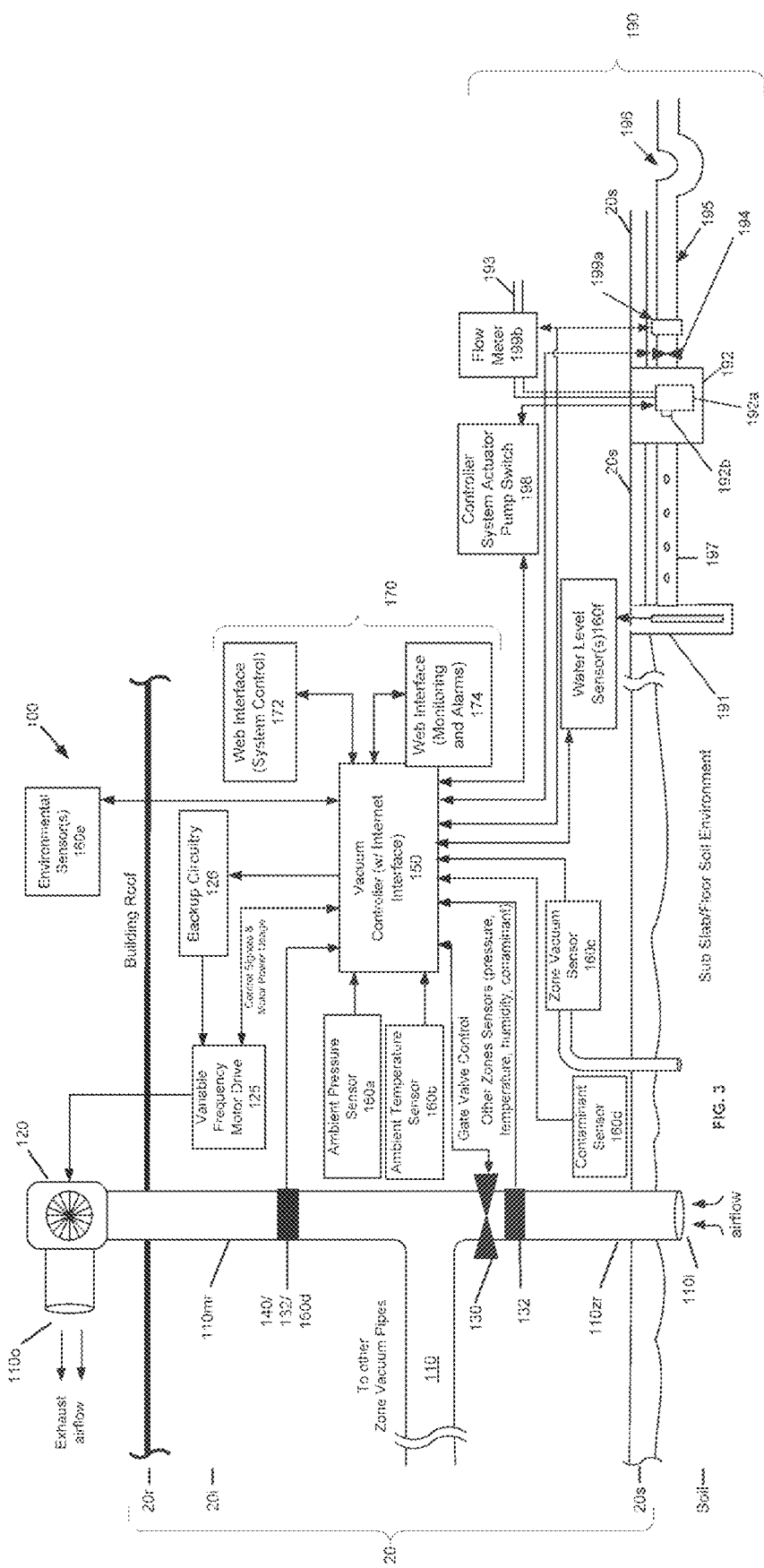
FIG. 3 is a block diagram of another dynamically controlled vapor mitigation system.

Referring to FIGS. 2 and 3, the dynamically controlled vapor mitigation system 100 may further include a monitoring system 170, which can generate, transmit and/or provide system alerts and faults. Additionally or alternatively, the monitoring system 170 can provide onsite and/or offsite network access to the system 100 so that workers and/or other system maintenance professionals can inspect and/or adjust operating parameters of the system 100. For example, the monitoring system 170 can include a first and second web interfaces 172, 174 that can be accessed via a local area network and/or the Internet. The first web interface 172 provides access to system control parameters, and the second web interface 174 provides access to system monitoring and alarm indicators and signals.

The monitoring system 170 can also be configured to collect data, such as system status data and/or environmental data so that system maintenance can be scheduled before a complete failure of the system occurs, thus reducing maintenance costs and minimizing building occupant contaminant exposure. This data, along with system alerts and/or faults, can be sent via the Internet to a host system that can collect the data and issue alarms or status updates electronically. Additionally or alternatively, the monitoring system 170 of the vacuum controller 150 can transmit alerts via common data services, such as email or text messaging. Accordingly, unattended buildings can be monitored at a low cost, since onsite checkups may be reduced and/or eliminated.

The system 100 may further comprise backup settings or backup setting circuitry 126 that configure the operation of the blower 120 in that case of a vacuum controller fault. For example, if the vacuum controller 150 is unable to determine an optimum vacuum level or the backup setting circuitry identifies a fault with the vacuum controller 150, the backup setting circuitry 126 can configure the blower 120 to operate in a predetermined state, such as a predetermined open-loop configuration. The predetermined state may correspond to a vapor mitigation system configuration based on collected measurements (e.g., such as the system configuration described with reference to FIG. 1).

The system 100 may further comprise ground water control system 190, which can monitor water table or groundwater level and transmit water level data to the vacuum controller 150. The water level data can be accessed locally or transmitted through monitoring system 170. For example, the water level data can be transmitted through monitoring system 170 for alarm notification of water level via the second web interface 174 or active control of water control system 190 via the first web interface 172. Water level sensor(s) 160f can be coupled to a water level monitoring well 191 to measure water level data. Data from water level sensor(s) 160f can be used for a variety of monitoring and/or control functions, such as actuating water pump(s) 192 (e.g. ground water pump 192a in combination with float switch 192b) to discharge water through pump discharge line 193. In some embodiments, the vacuum controller 150 may be configured to control water pump(s) 192 through a controller system actuator pump switch 198. Alternatively or additionally, the controller 150 can be configured to engage system actuated gravity discharge valve 194 to drain ground water though gravity discharge line 195 and/or siphon 196. Since air and water are both fluids that are competing for the same void spaces between the soil particles or the sub slab fill material, the controller may be configured to reduce the speed of the blower to achieve a predetermined level of sub slab vacuum or a minimum number of motor revolutions (e.g., rpm) prior to actuating a discharge pump, gravity feed drain valve or siphon drain. Once the desired water level is achieved and the water discharge pump is deactivated and/or valves that can facilitate gravity feed or siphon drains are closed, the controller can signal the blower to return to the previously set performance range. Water discharge events along with corresponding altered vacuum or airflow may be recorded on a local network and/or transmitted via the cloud based system for off site data storage and a record of each water draw down event recorded in the client summary report. Volume and flow rate of discharged ground water may be measured at either or both of flow meters 199a-b to calculate, monitor, and report the total volume of water and/or contaminants removed. In some instances, discharged ground water may need to be treated to remove or neutralize contaminates.

Figure 4:
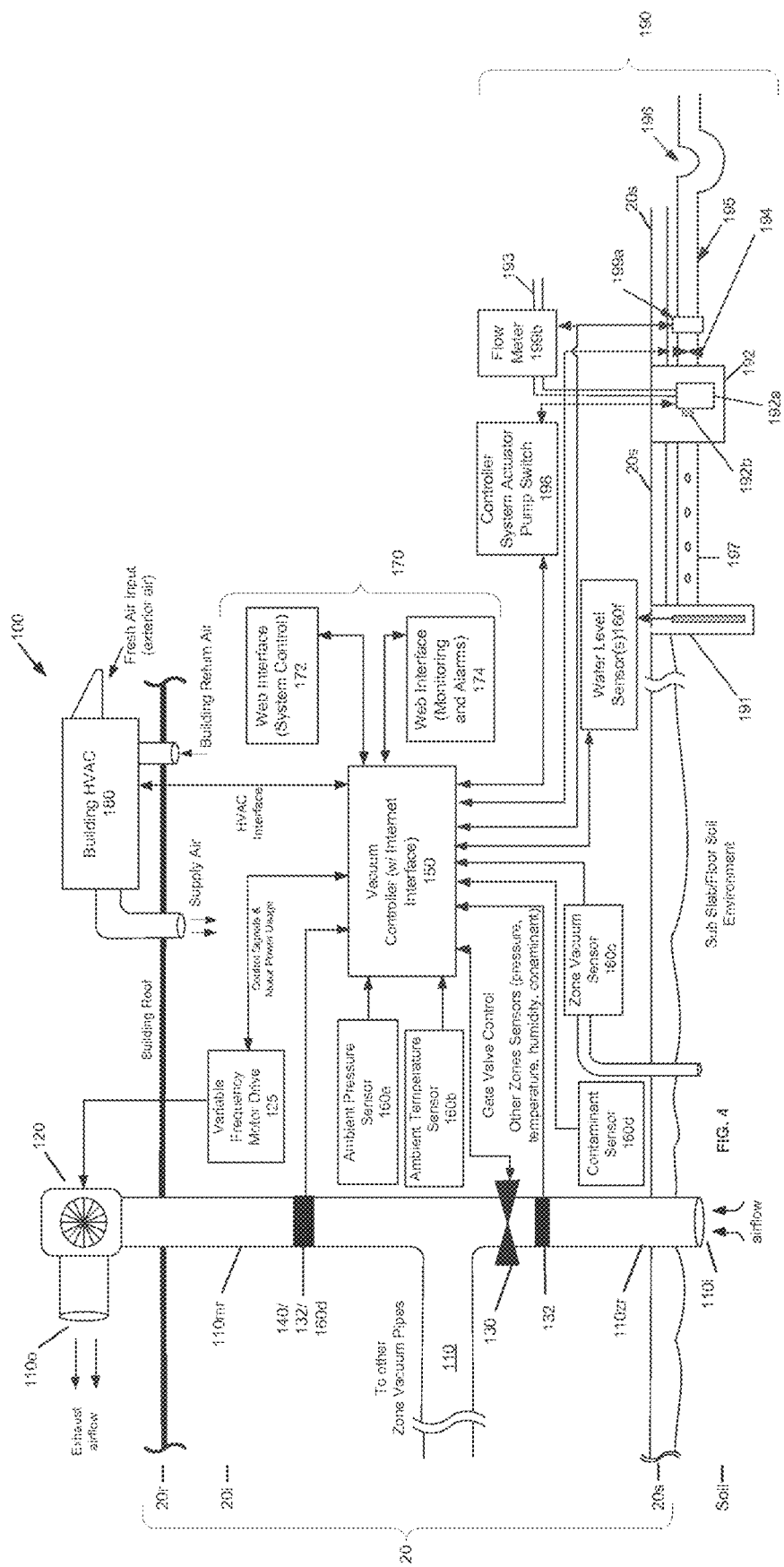
FIG. 4 is a block diagram of another dynamically controlled vapor mitigation system.

FIG. 4 is a block diagram of another dynamically controlled vapor mitigation system. Further to the dynamically controlled vapor mitigation systems 100 shown in FIGS. 2 and 3, the vacuum controller 150 may be further configured to control the floor or slab 20s vacuum pressure by interfacing with the building HVAC system 180. In some implementations, the controller 150 may be configured to control various parameters of the building HVAC system 180. For example, the controller 150 my command the building HVAC system 180 to introduce a greater amount of fresh air into the interior of the building 20i so as to reduce contaminant concentrations detected by the contaminant sensor 160d.

In some embodiments, the vacuum controller 150 may be configured to control one or more parameters of the building HVAC system 180 so as to adjust an interior building pressure and/or the amount of fresh air supplied to the building interior 20i. For example, the convective forces of the HVAC system 180 may create negative pressures within the building interior 20i, which can draw VOC's, methane and/or radon vapors into the building interior 20i. In response to the convective forces, the vacuum controller 150 may be configured to counterbalance the effects of the convective forces by mechanically pressurizing the building interior 20i with excess exterior air (e.g., fresh air input). Furthermore, the exterior air drawn into the building interior 20i through the HVAC system 180 generally has a lower concentration of contaminants. Accordingly, the vacuum control 150 may be configured to dilute the air within the building interior 20i to further lower indoor contaminate concentrations.

The vapor mitigation system 100 may further include any of the above features or elements of the vapor mitigation systems 10, 100 described above.

Figure 5:
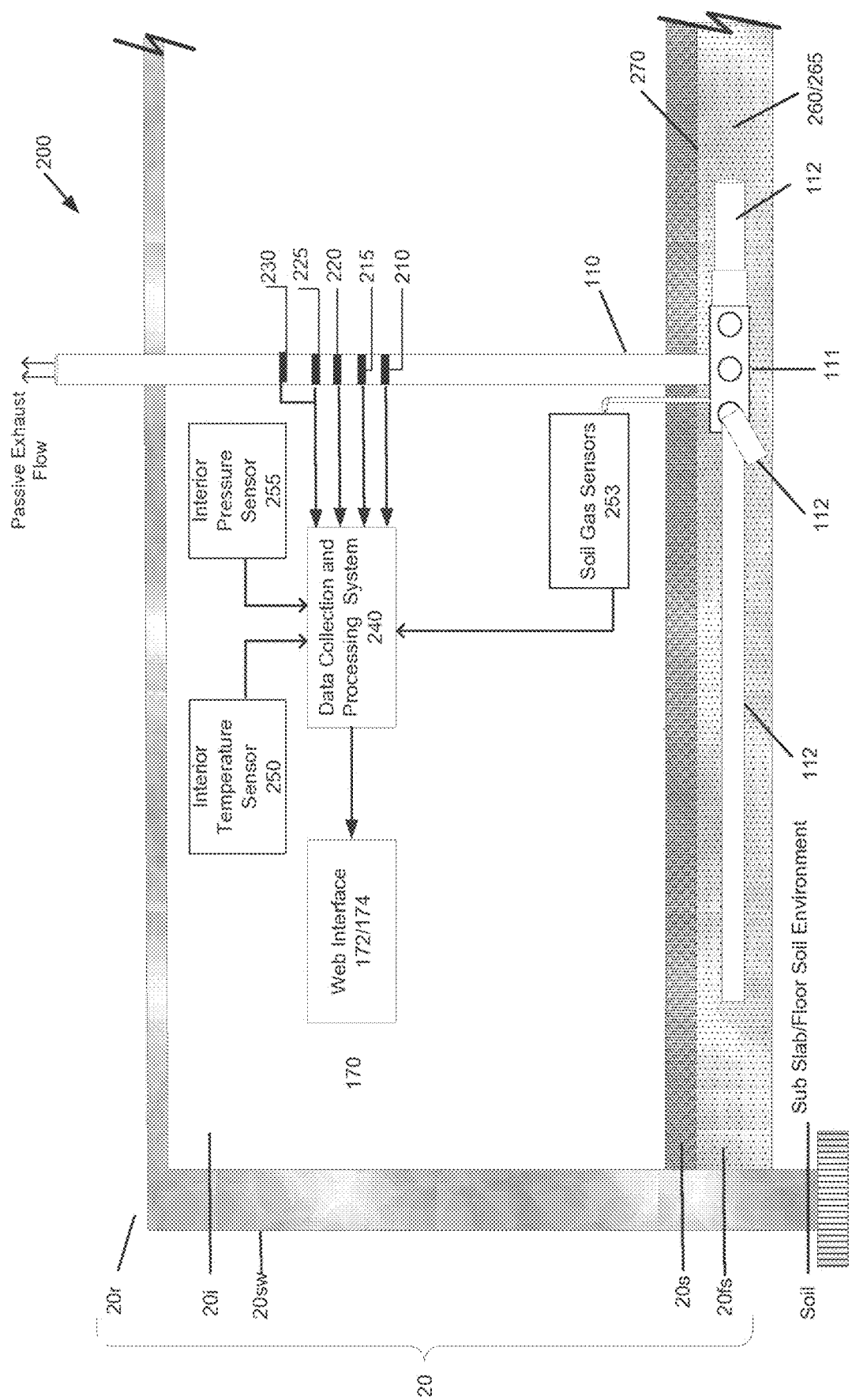
FIG. 5 is a block diagram of a passive vapor mitigation system.

FIG. 5 is a block diagram of a passive vapor mitigation system. A vapor mitigation system 200 can be installed as part of a new construction building 20, or installed as part of an existing building 20. The vapor mitigation system 200 includes one or more vacuum pipes 110 for collecting and venting soil vapors (VOC vapors, radon vapors and/or other vapors). For example, in the present exemplary embodiment, a collection box 111 having a network of gas conveyance pipes 112 is shown coupled to the vacuum pipe 110. The network of gas conveyance pipes 112 collects soil vapors from beneath the building floor or slab 20s, and funnels the soil vapors to the collection box 111 where the soil vapors are vented to an exterior of the building by the vacuum pipe 110. The vapor mitigation system 200 is constructed and arranged to create natural convection under the floor, vapor barrier or slab 20s of the building 20 so as to collect and vent the soil vapors without the use of an active transport device, such as a blower or fan.

The vapor mitigation system 200 can be configured to monitor the performance of new construction passive systems or existing construction passive systems, which rely on convective airflow that is induced by weather and building features. The operation of these systems 200 is dependent upon the construction features and weather. Construction features of the building can include such features as: angularity, height and HVAC system. These features can affect the convective flow of air and induce pressure differentials between the interior of the building and the underlying soil or sub floor. The weather, interior/exterior pressure differentials such as forces applied on a building by wind, and changes in the barometer can cause fresh dilution to move down the riser pipe or vacuum pipe 110 and into the sub slab soil environment as well as create convective venting of the sub slab. Monitoring the condition of the systems 200 enables consultants to measure the passive effectiveness of the systems 200 as well as develop a data base to support continued passive venting or provide cause to change the system to active by installing a blower.

The vapor mitigation system 200 includes a floor system 20f s for collecting the gaseous vapors from beneath the building floor or slab 20s. In one embodiment, the floor system 20f s includes a bed of crushed stone 260 that surrounds the network of conveyance pipes 112 and/or the collection box 111. The floor system 20f s can also include a crawl space and/or a vapor barrier 270 to prevent the soil vapors from entering the building interior 20i. In another embodiment, the bed of crushed stone 260 is replaced with an aerated floor system 265, such as Cupolex®. The aerated floor system 265 can include a grid of interconnected plastic arch forms that are applied over the soil prior to the pouring of concrete, which creates hollow spaces beneath the slab 20s after the concrete is poured and cured. The network of conveyance pipes 112 collect the soil vapors beneath the building floor or slab 20s so that the soil vapors can be passively vented to an exterior of the building 20.

In situations where it is unclear what design (crushed stone or aerated floor system) is the most efficient and effective solution from an environmental abatement, energy efficiency and financial effectiveness point of view, a data collection system 240 and a series of monitoring sensors 210, 215, 220, 225, 230, 250, 253, 255 can be installed. By comparing data from systems 200 that utilize a bed of crushed stone 260 and systems 200 that utilize an aerated floor system 265, building engineers and consultants can determine which design (crushed stone or aerated floor system) is the most efficient and effective solution.

The data collection system 240 is connected to a plurality of monitoring sensors, and is configured to collect data during operation of the system 200. For example, the data collection system 240 can be connected to a mass airflow sensor 210 for determining a mass flow rate and direction of air exiting/entering the vacuum pipe 110, an air humidity sensor 215 for determining the humidity of air exiting/entering the vacuum pipe 110, an air temperature sensor 220 for determining the temperature of air exiting/entering the vacuum pipe 110, inline pressure differential sensors for determining directional convective flow pressure 225, and a contaminate sensor 230 for determining a type and concentration of contaminant within the air exiting/entering the vacuum pipe 110. The data collection system 240 can also be connected to an interior temperature sensor 250 for sensing the ambient temperature within the building interior 20i, and an interior pressure sensor 255 for sensing the pressure within the building interior 20i. The data collection system 240 can be connected to soil gas sensors 253 for sensing VOC's, methane gas and/or radon gas.

The data collected and recorded by the data collection system 240 can be accessed by building engineers and consultants via a web interface 172/174 for determining various operating conditions of the vapor mitigation system 200 over a period. For example, directional air flow data collected from the mass airflow sensor 210 can indicate whether the system 200 is venting soil gases or recharging the soil (sub slab) with outside air.

Changes in barometric pressure, temperature, airflow around a building and convective variation are all variables that contribute to the effectiveness of passive venting. By monitoring contaminant concentrations and other system parameters, designers, building engineers and consultants can quantify the effectiveness of these systems and determine which designs are best suited for the contaminate soil conditions and features of a particular building or structure. The data collection and processing system 240 allows the designers, building engineers and consultants with data that can be used to evaluate the effectiveness of various passive soil gas vent designs.

Figure 6:
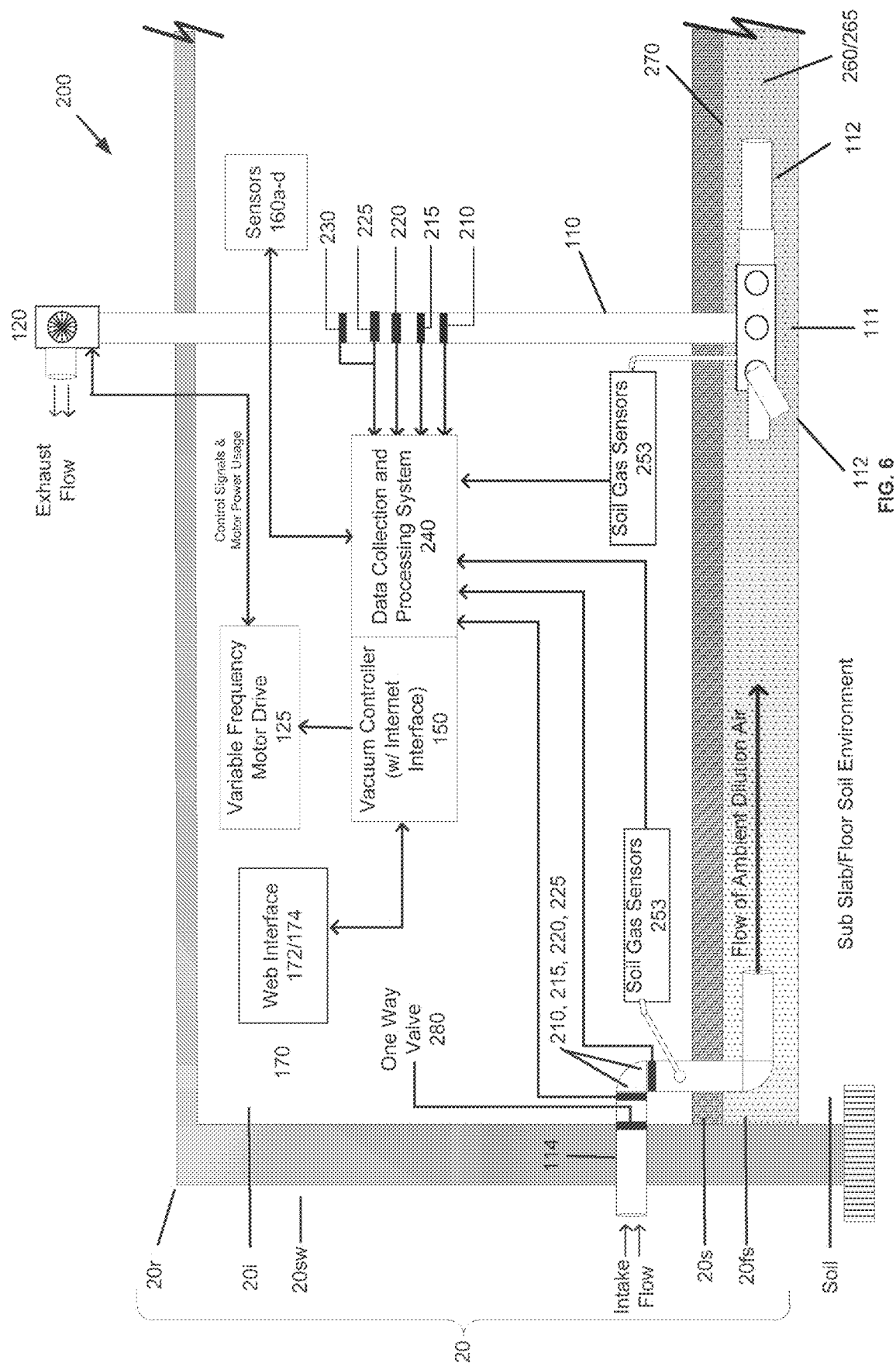
FIG. 6 is a block diagram of a dynamically controlled active vapor mitigation system.

FIG. 6 is a block diagram of a dynamically controlled vapor mitigation system. A vapor mitigation system 200 can be installed as part of a new construction building 20, or installed as part of an existing building 20. In some embodiments, the vapor mitigation system 200 can have sufficient passive convection (natural convention) to effectively vent the sub slab. However, in other embodiments, changing environmental factors can prevent the vapor mitigation system 200 from venting the sub slab in a passive mode alone. To properly vent the sub slab, the vapor mitigation system 200 can be further configured with active venting elements. For example, the vapor mitigation system 200 can include a blower 120, a variable frequency motor drive 125 and a vacuum controller 150. The vacuum controller 150 can be configured to operate the blower 120 in response to data received from the data collection and processing system 240 and the sensors 210, 215, 220, 225, 230, 253 coupled to the vacuum pipe 110 and/or the fresh air intake. For example, if directional air flow data collected from the mass airflow sensor 210 or the pressure differential sensor 225 indicates that the system 200 is recharging the sub slab with outside air, the vacuum controller 240 can activate the blower 120 (thereby applying a vacuum pressure to the sub slab) to return the system 200 to a venting state. While the vacuum controller 150 and data collection and processing system 240 are shown as separate blocks, these elements can be implemented by the same processor or controller element. The vapor mitigation system 200 can include any of the above features or elements of the active vapor mitigation systems 100 shown and described in connected with FIGS. 1-4.

In some passive and active embodiments, the system 200 includes a fresh air intake that can be positioned, for example, in the side wall 20sw of the building 20. The fresh air intake 114 includes piping, and is constructed and arranged such that an inlet of the fresh air intake piping is positioned at an exterior of the building and an outlet of the fresh air intake piping is positioned beneath the building floor or slab 20s. The fresh air intake 114 provides for the conveyance of outside dilution air to the sub slab or floor soil environment of the building 20. The fresh air intake 114 can be provided in systems 200, for example, when it is beneficial to mix fresh air with the soil gases that are seeping out from the vadose zone of the soil environment beneath the building 20 for the purpose of lowering the potential for combustion or explosion of the soil gases. The ambient dilution air provided by the fresh air intake 114 can also be used to lower volumetric contaminant concentrations beneath the building floor or slab 20s. Ambient dilution air may also be introduced to the sub slab for the purpose of drawing that air through the system for the purpose of cooling the motor assembly. For example, a temperature sensor may be electrically connected to the controller and coupled to the blower for the purpose measuring and monitoring the temperature of the blower motor assembly. In some embodiments, the vacuum pipes 110 are located in the center of the building 20 or on a sidewall that is opposite the inlet of the fresh air intake 114 so as to attain maximum dilution benefit from the introduction of fresh air.

The vacuum controller 150 of the system 100 is configured to control and/or adjust the level of vacuum applied under the floor or building slab 20s of the building 20 in response to building and/or environmental measurements. These measurements can include, for example, ambient temperatures, interior vacuum pipe temperatures, building interior air pressure, building exterior air pressure, building sub slab or floor air pressure, contaminant detection, blower mass air flow, direction of airflow and/or in riser vacuum measurements. In some embodiments, the system 200 can be configured to operate in a passive mode (blower off) when there is sufficient passive convection (natural convention) to effectively vent the sub slab, and can be configured to operate in the active mode (blower on) when there is insufficient passive convection.

As described above in connection with the active vapor mitigation systems of FIGS. 2-4, the vacuum controller 150 may be configured to vary the power applied to the blower 120 (so as to adjust the blower fan speed and applied vacuum) and/or to adjust the opening or closing of an electronically controlled gate valve 130 (not shown) in response to the building and/or environmental measurements.

For example, when the sub slab soil gas sensor 253 nearest the vacuum pipe 110 or near the fresh air intake measure contaminant concentrations that exceed predetermined sub slab concentrations, the data collection system 240 and/or the vacuum controller can activate the blower 120 or increase the speed of the blower 120 to exhaust the contaminants and lower the contaminant concentration. In some embodiments, the sub slab vacuum induced by the blower 120 opens a one way valve 280 of the fresh air intake 114, which permits fresh air to be drawn through the sub slab. The data collection system 240 can collect and record data from sensors 210, 215, 220, 225, 230 of the fresh air intake 114, such as barometric pressure, mass airflow, vacuum pipe pressure differentials, air temperature, air humidity and contaminant concentration. Contaminant concentrations near the fresh air intake may reduce quickly in response to the vacuum induced by the blower 120, while contaminant concentrations near the vacuum pipe 110 inlet may reduce at a slower rate. When contaminant sensors determine that contaminant concentrations near the vacuum pipe 110 inlet and/or in the vacuum pipe 100 itself are reduced to a predetermined level, such as Lower Explosive Limit (LEL), the motor speed of the blower 120 is reduced or the blower 120 is turned off by the system 200 for the purpose of conserving energy.

In this manner, the vacuum controller 150 can determine and control the on/off position or create an optimum vacuum level to be applied under the floor or building slab 20s. Accordingly, energy inefficiencies can be reduced by monitoring the building and/or environmental measurements, and reducing the power/speed of the blower 120 when the vacuum applied under the floor or building slab 20s exceeds operating requirements. In addition, the controller 150 can increase the power/speed of the blower 120 if a higher level of contaminants is detected within the building interior 20i.

The methods and processes disclosed herein can be implemented by the systems and devices described herein, or by equivalent systems and devices, executing a unique set of instructions stored or embodied in computer accessible media. As will be appreciated by those skilled in the art, a unique set of instructions can be implemented or embodied as executable code, such as, software, firmware, machine code or a combination thereof. As such, the unique set of instructions stored or embodied in computer accessible media transforms the systems and devices described herein into particular, special purpose systems and devices that can operate, for example, according to the following exemplary flow diagram. In some embodiments, unique sets of instructions correspond to the methods and processes disclosed FIG. 7 and described below in further detail.

Figure 7:
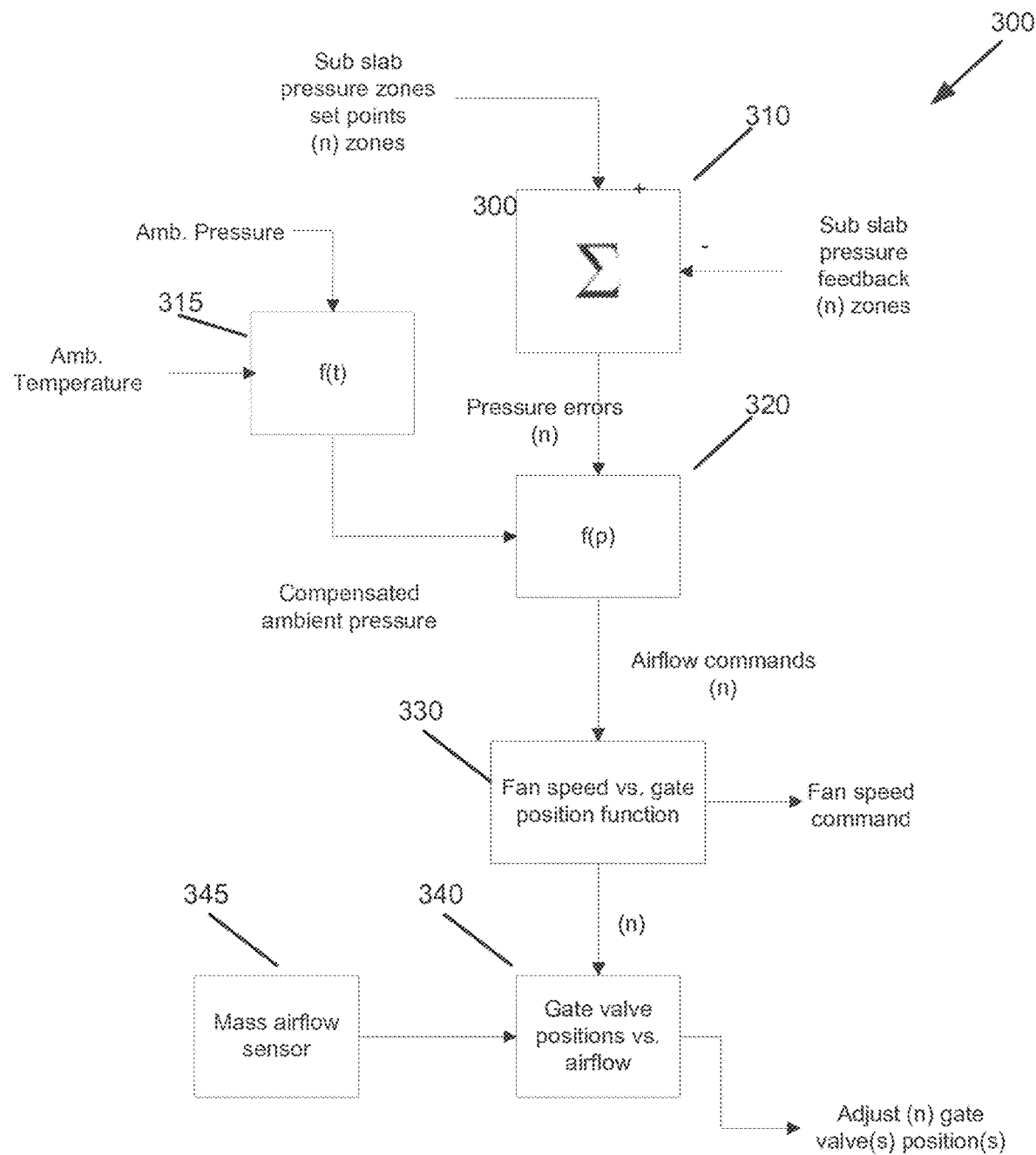
FIG. 7 is a flow diagram illustrating a method of controlling a vapor mitigation system.

FIG. 7 is a flow diagram illustrating a method of controlling a vapor mitigation system. The flow diagram illustrates a method 300 of controlling a vapor mitigation system 100, 200. At step 310 the controller (vacuum controller or processing system) compares preset pressure zone set points to measurements captured by the sub slab pressure sensors in each of the zones being controlled. The outputs at step 310 are the pressure zone error signals. At step 320 the zone pressure error signals are modified by the compensated ambient pressure level, which is a composite signal of the ambient pressure and ambient temperature which is generated at step 315. The outputs of step 320 are the airflow commands. At step 330 the magnitude of the airflow commands are used to generate gate valve position commands and the fan speed command signals. The fan speed signals are used to control the variable speed motor drive that controls the fan speed as shown in FIGS. 2-4 and 6. At step 340, the gate valve position commands are modified based on the output of the mass airflow sensor 345. The gate valves are positioned accordingly to the commands generated from step 340.

Figure 9:
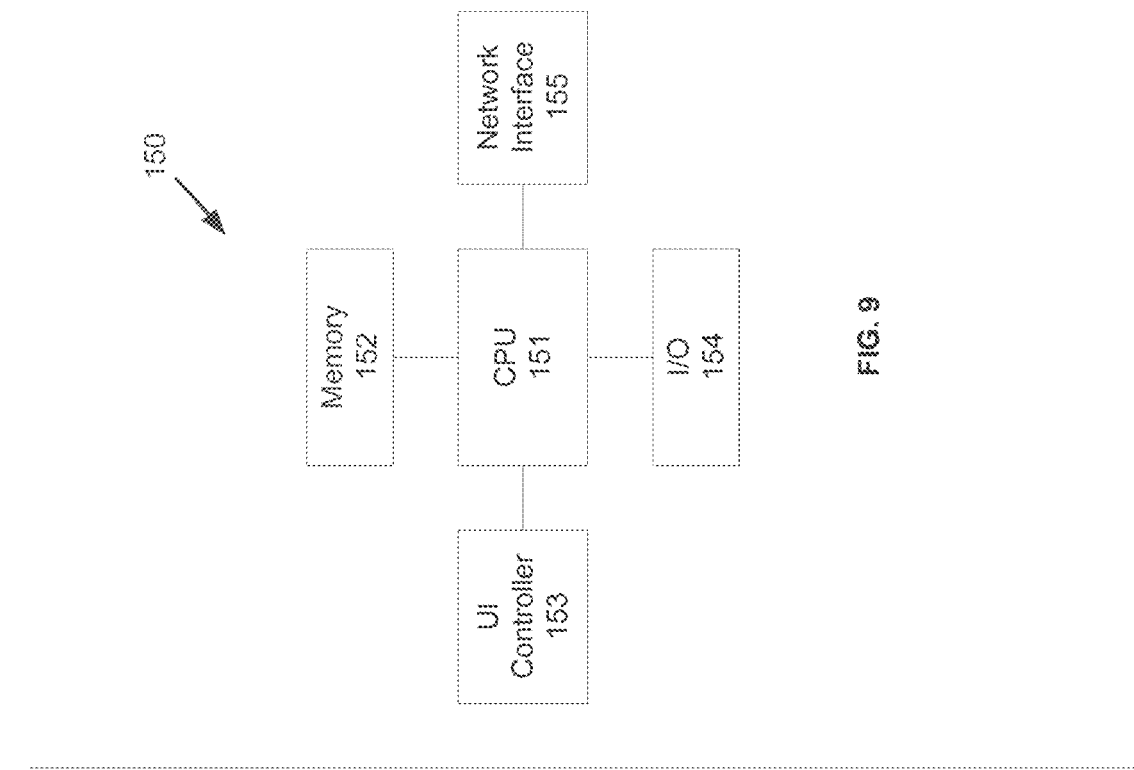
FIG. 9 is a block diagram of a vacuum controller.
Figure 8:
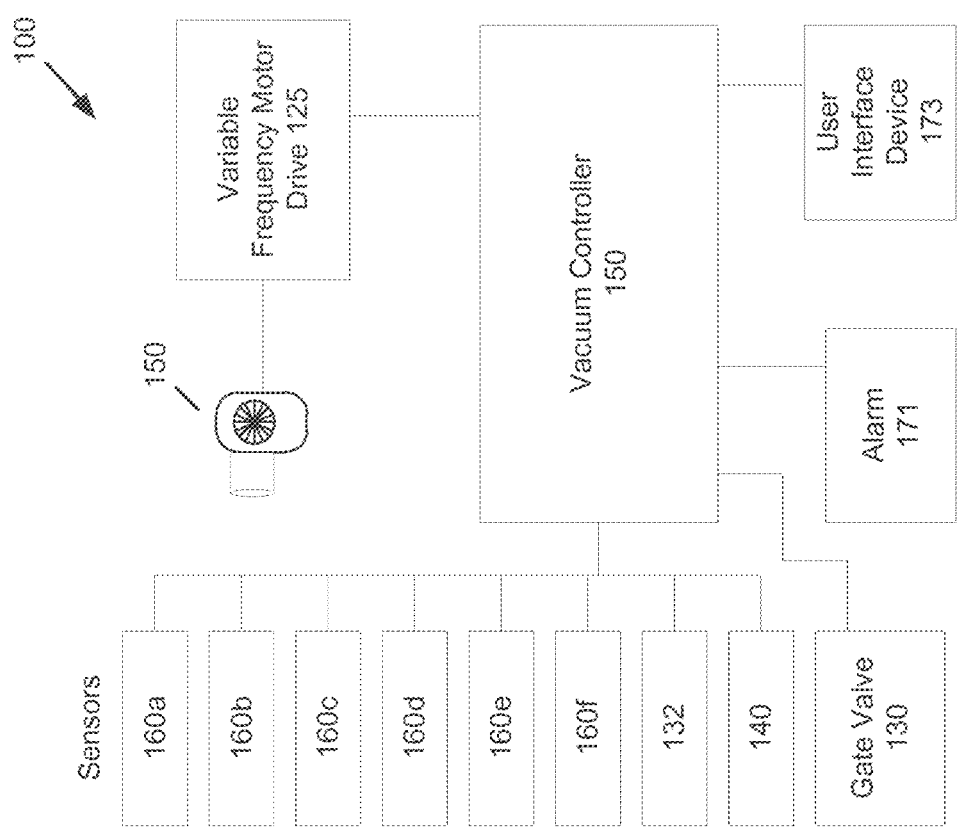
FIG. 8 is a block diagram of a sensor controlled vapor mitigation system.

FIG. 8 is a block diagram of a vapor mitigation system, and FIG. 9 is a block diagram of a vacuum controller. As described above with regard to FIGS. 2-4, a dynamically controlled vapor mitigation system 100 can be installed and/or provided in a building or structure 20 and is constructed and arranged to create a negative pressure under a floor, building slab or vapor barrier 20s of a building 20 so as to collect and vent VOCs, methane and/or radon vapors.

The vapor mitigation system 100 includes a vacuum controller 150 that is configured to control the operational state of the system 100. The vacuum controller 150 may be coupled to one or more of the following sensors: a mass air flow sensor 140, an ambient pressure sensor 160a, an ambient temperature sensor 160b, an inline zone vacuum sensor 160c, a contaminant sensor 160d, an environmental sensor 160e, a water level sensor 160f, and a vacuum/pressure sensor 132. The sensors 160a-f, 132, 140 can be electronically coupled (wired or wirelessly coupled) to the vacuum controller 150.

The vapor mitigation system 100 may further include a user interface device 173. In some embodiments, the user interface device 173 includes a display device, such as, a liquid crystal display (LCD), a light-emitting diode display (LED), an electronic paper display (E Ink), an organic light-emitting diode display (OLED), or other type of display device capable of presenting information in a visual form to a user. In some embodiments, the display device is a touchscreen device that a user can control through simple or multi-touch gestures by touching the screen with one or more fingers. The user interface device 173 may also include one or more user input devices, such as, a keyboard, a trackball and buttons.

The vapor mitigation system 100 may further include an on-site alarm system 171 that is configured to provide an audible and/or visual form of an alarm signal indicating a problem or condition of the vapor mitigation system 100. The vapor mitigation system 100 may further include any of the above features or elements of the vapor mitigation systems 10, 100, 200 described herein.

Referring to FIG. 9, the vacuum controller 150 may include a central processing unit (CPU) 151, memory 152, a user interface controller 153, an input/output sub-system 154 and a network interface 155. The central processing unit 151 can include a microprocessor, programmable logic circuit or other processing device for controlling operation of the vapor mitigation system 100. The memory 152 can include random access memory, read only memory, flash memory and/or other types of volatile and non-volatile for storing system parameters and/or system performance data. The user interface controller 153 can include a video processor or controller for rendering a user interface displayed on the user interface device 173. The input/output subsystem 154 can include parallel and/or serial interface systems (e.g., I2C, USB, RS-232) for transmitting and/or receiving data from the sensors 160a-f, 132, 140 and devices 130, 171 coupled to the vacuum controller 150. The network interface 155 may include a network interface controller, wireless area network controller, or cellular data card for accessing a local network and/or the Internet.

Figure 10:
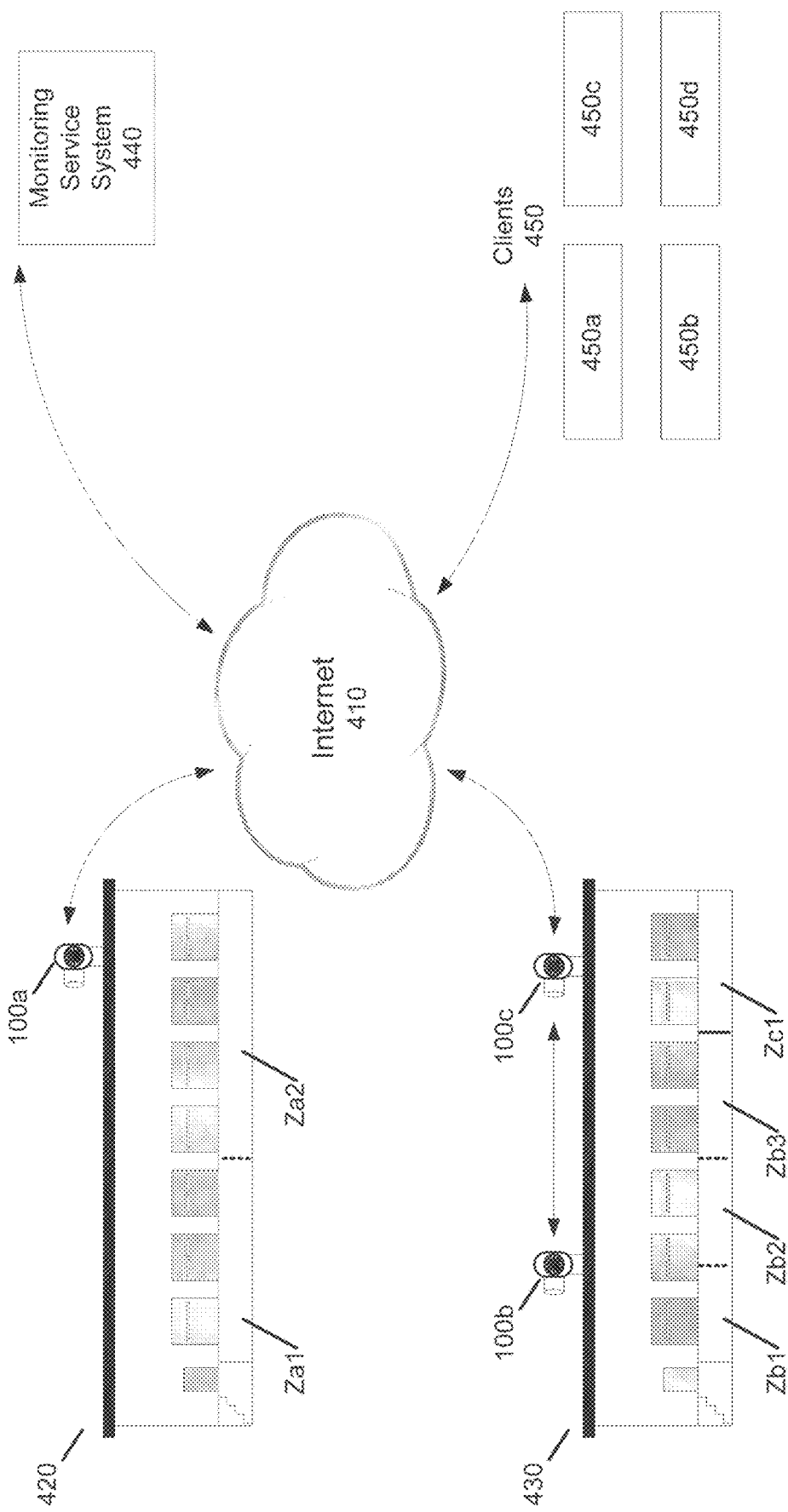
FIG. 10 is an architectural view of vapor mitigation systems in communication with remote systems and devices.

FIG. 10 is an architectural view of vapor mitigation systems in communication with remote systems and devices via the Internet. The Internet 410 is a global system of interconnected computer networks that operate according to at least the Transmission Control Protocol (TCP) and Internet Protocol (IP) communication standards. The Internet 410 is capable of transmitting and routing electronic information or data between computer systems, devices and networks located around the World.

In this exemplary embodiment, first through third vapor mitigation systems 100a-c, a monitoring service system 440 and clients 450 are each connected to the Internet 410. Although the present embodiment shows first through third vapor mitigation systems 100a-c, a monitoring service system 440 and clients 450, any number of vapor mitigation systems 100a-c, monitoring service systems 440 and clients 450 may be configured as described herein.

The vapor mitigation systems 100a-c, monitoring service system 440, and clients 450 can communicate (receive and/or transmit data) through the Internet 410 with each other. For example, in some embodiments, one or more of the vapor mitigation systems 100a-c may be configured to transmit system parameters and/or system performance measurements to the monitoring service system 440. The system parameters may include mode of operation, gate valve position, airflow set points, vacuum set points, contaminant type, contaminant set points and/or blower current set points (such as the system parameters shown in FIG. 11). The system performance measurements may include blower current, main riser airflow, main riser vacuum pressure, main raiser contaminant type, main raiser contaminant concentration, sub-riser airflow, sub-riser vacuum pressure, sub-riser contaminant type, sub-riser contaminant concentration, sub-slab vacuum pressure, energy consumption and environmental data (such as the system performance measurements and environmental measurements shown in FIG. 11).

The monitoring service system 440 may include a central processing unit (CPU), memory, a user interface controller, an input/output sub-system, and a network interface. The central processing unit of monitoring service system 440 can include a microprocessor, programmable logic circuit or other processing device for controlling operation of the monitoring service system 440. The memory of monitoring service system 440 can include random access memory, read only memory, flash memory and/or other types of volatile and non-volatile for storing system parameters and/or system performance data. The user interface controller of monitoring service system 440 can include a video processor or controller for rendering user interface 500. The input/output sub-system of monitoring service system 440 can include parallel and/or serial interface systems (e.g., I2C, USB, RS-232) for transmitting and/or receiving data from the sensors 160a-ef, 132, 140 and devices 130, 171 coupled to the vacuum controller 150. The network interface monitoring service system 440 may include a network interface controller, wireless area network controller, or cellular data card for accessing a local network and/or the Internet.

Figure 11:
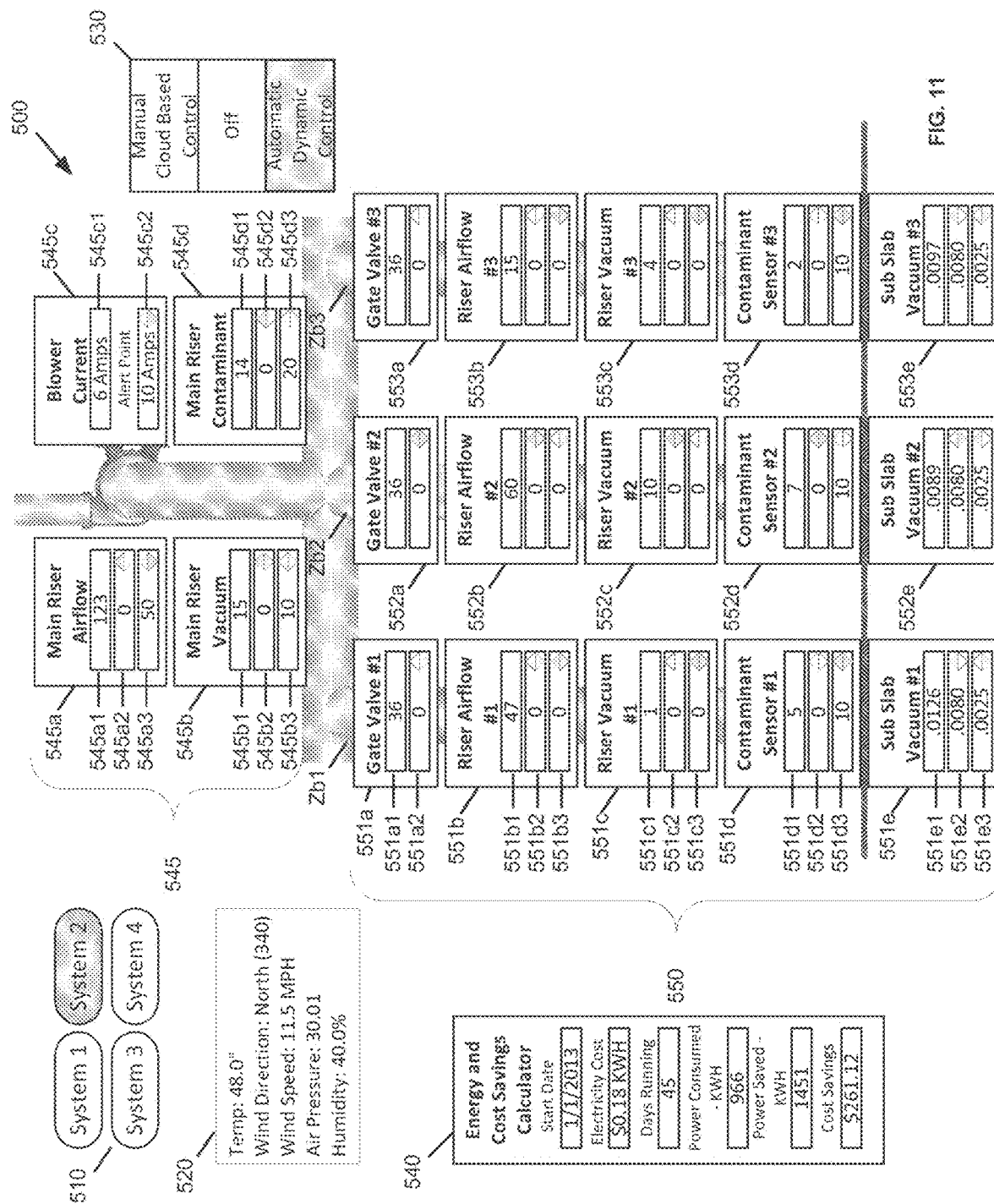
FIG. 11 is a diagram of a user interface for inputting parameters and monitoring system performance of a vapor mitigation system.

The monitoring service system 440 may include an individual server system or a plurality of server systems that are connected to the Internet 410. The monitoring service 440 may be configured as a cloud computing resource for controlling and/or monitoring the first through third vapor mitigation systems 100a-c. For example, the monitoring service 440 may be configured to receive and/or collect data, such as system parameters and system performance measurements, from the first through third vapor mitigation systems 100a-c, and may be further configured to generate a user interface for monitoring and/or controlling the first through third vapor mitigation systems 100a-c. Monitoring service 440 may be further configured to generate, transmit and/or provide system alerts and faults. For example, FIG. 11 illustrates an exemplary user interface 500 that may be generated by the monitoring service 440. The user interface 500 may be a web-based user interface that can be accessed by users via client devices 450, 450a-b. Alternatively or additionally, the user interface 500 illustrated in FIG. 11 may be generated by the vacuum controller 150 of the vapor mitigation systems 100a-c. The clients 450, 450a-d may include user devices such as personal computers, tablets and cellular telephones. The clients 450, 450a-d may include a browser facility for rendering the user interface generated by the monitoring service system 440 or the vapor mitigation systems 100a-c. Further, the monitoring service system 440 may be configured to generate a performance report, such as the performance report shown in FIGS. 12A-12E. Alternatively or additionally, the vacuum controller 150 of the vapor mitigation systems 100a-c may be configured to generate a performance report, such as the performance report shown in FIGS. 12A-12E. The performance report may be generated by the monitoring service system 440 or the vacuum controller 150 in an electronic format such as a portable document format (PDF), rich text format (RTF), HyperText Markup Language (HTML) format, electronic mail (email), or other electronic format.

The first through third vapor mitigation systems 100a-c are installed and/or provided in buildings or structures 420, 430. For example, the first vapor mitigation system 100a is provided in a first structure 420, and the second and third vapor mitigation systems 100b-c are provided in a second structure 430. The first through third vapor mitigation systems 100a-c may include any of the above features or elements of the vapor mitigation systems 10, 100, 200 described herein.

As described above, vapor mitigation systems 100, 100a-c can be arranged and/or configured to vent an exhaust airflow of VOC, methane, radon and/or other vapors and gasses to an exterior location of a building or structure 420, 430. In the present exemplary embodiment, the first vapor mitigation system 100a is configured as a two zone system (Za1, Za2), the second vapor mitigation system 100b is configured as a three zone system (Zb1, Zb2, Zb3), and the third vapor mitigation system 100c is configured as a single zone system (Zc1). In some embodiments, the vapor mitigation systems 100a-c include a blower coupled to a first end of a main riser pipe. A number 'n' of zone riser pipes are coupled to the second end of the main riser pipe to extract vapor and gasses from the sub slab of the building or structure (where 'n' equals the number of zones of the vapor mitigation system). For example, the first vapor mitigation system 100a includes two zone riser pipes coupled to the main riser pipe of the system, the second vapor mitigation system 100b includes three zone riser pipes coupled to the main riser pipe of the system (see system diagram illustrated in FIG. 11), and the third vapor mitigation system includes a single zone riser pipe coupled to the system. While the present exemplarily embodiment discloses single zone, two zone and three zone vapor mitigation systems, a vapor mitigation system may be configured with any number of zones, and each zone of the vapor mitigation system my include one or more zone riser pipes.

FIG. 11 is a diagram of a user interface for inputting parameters and monitoring system performance of a vapor mitigation system. In some embodiments, the user interface can function in a "read-only" mode so that a user (e.g., "Building Owner") can review system parameters or in a user controlled mode so that an operator (e.g., "Engineer") can review and modify system parameters. The user interface 500 includes a diagram illustrating the configuration of a vapor mitigation system. For example, the present embodiment illustrates the configuration of the second vapor mitigation system 100b (three zone system, Zb1, Zb2, Zb3) shown in FIG. 10. The user interface 500 includes a system selection interface area 510 for selecting one of a plurality of vapor mitigation systems installed at single location or structure, or associated with a user's account. For example, the "System 2" identifier is shown in a selected state (as illustrated by the gray colored highlight within the "System 2" icon).

In a vapor mitigation system, operational priority and control of the blower and gate valves can be assigned to respond to different types of sensors, such as sub slab pressure sensors, riser pipe airflow sensors, contaminate concentration sensors, water level sensors, humidity sensors and/or other sensors and parameters that are relevant to control vapor conveyance. Different vapor conditions relative to the vapor concerns that are impacting the building, the building occupants, or the quantity of contaminant discharged to outdoor air are evaluated to assign system control priority to achieve performance objectives which will vary based on the buildings use, population type and toxicity of the subject vapor contaminants.

In some embodiments, organic vapors or radon are the concern and priority will be assigned to the sub slab pressure differential sensor so that the system can maintain a specified level of vacuum beneath the slab. For example, the sub slab pressure differential sensor can be assigned the highest priority so that the system can maintain a specified level of vacuum beneath the building slab, such as 0.008" water column (w.c.) or 2.0 pascals. Pressure differentials are often set by environmental regulatory agencies and have been deemed as acceptable thresholds to prevent sub slab vapors from entering an occupied space of a building or structure. The amount of vacuum that needs to be applied by the blower to the sub slab is constantly changing based on the environmental conditions that create pressure differentials in and around buildings. Some of these contributing factors are the temperature differential from inside to outside of the building, wind loading, and mechanical devices that effect pressures such as HVAC systems and fume hoods. These pressures are most extreme during the heating season. Assigning priority to a specific sub slab pressure differential insures that the blowers are always operating at the most efficient percentage of base speed to achieve the pressure differential goal. Because the motor speed of the blower is being dynamically controlled by setting priority to achieving a constant pressure under most conditions, the motor can operate at a slower speed and generate less vacuum than what would be required during maximum load conditions. Maximum building load conditions can be generated by large inside to outside temperature differentials, shifts in barometric pressure, high winds and mechanical exhaust devices which induce negative pressures within a building. Operating the blower motor at a lower percentage of base speed than what is required under maximum load can provide significant electrical power savings and reduce greenhouse gasses that are produced by power plants that burn fossil fuels.

In some embodiments, depressurizing a large subfloor cavity beneath a building crawlspace or the floor slab that is impacted by radon, organic contaminants or methane, motor speed priority may be assigned to regulate airflow volume. The volume of soil gas exhaust through a system riser pipe can be set to achieve a certain number of air changes per hour based on the volume of the sub slab cavity or the area of the building foot print where a contaminant such as methane or VOCs may be a concern. Sub slab pressures in these areas are influenced by the same loading factors that induce pressure differentials in buildings such as inside to outside temperature differentials, shifts in barometric pressure, high winds and mechanical exhaust devices. Similarly, the blower motor will operate at different percentages of base speed to maintain a constant volume of soil gas flow from the sub slab air chambers, such as a crawlspace, in response to varying pressures in and around the building.

In some embodiments, operation priority can be set to control the blower motor speed and regulate the flow of soil contaminants from the sub slab into the atmosphere. Depending on the contaminant type, regulatory agencies have set limits on the total mass of a contaminant that can be discharged into the atmosphere without obtaining an expensive discharge permit. Contaminant discharge thresholds are usually expressed in U.S. pounds per year. When it is the objective to control contaminate discharge, information from the contaminant concentration sensors and airflow sensors are used to determine a contaminant mass flow rate and annualized discharge volume. In these cases the blower motor speed can be adjusted to respond to regulate the soil gas flow rate to reduce or limit the total emissions.

In some embodiments, such as the mitigation of a dry cleaner or an industrial facility where there is a "contaminant hot spot" beneath the slab, information from the contaminant sensor and airflow sensor within a single riser may be employed to electromechanically adjust a gate valve to control the flow rate and contaminant yield from a selected hot spot zone within a multi-riser system. Regulating the discharge flow from select risers within a multi-zone system would facilitate maintaining the sub slab vacuum objectives in other zones throughout system without exceeding permissible discharge standards.

In embodiments where exceeding contaminant discharge thresholds is a concern, multi-tiered priority can be assigned. For example, the highest priority can be assigned to not exceeding discharge standards. Contaminate and airflow sensor data would be used to establish a flow rate and mass annualized discharge. Priority can be assigned to regulate the contaminant yield using the electromechanically controlled gate valve. In this case, using the contaminant and airflow data to prevent a discharge exceedance would be assigned a higher priority than maintaining sub slab vacuum within this zone. In a vapor system, vacuum is inversely proportional to airflow. As the gate valve restricts airflow from the offending riser, the blower motor controller would respond to the increased sub slab vacuum in the other zones and slow the speed of the motor to maintain maximum energy efficiency.

In embodiments having multi-riser systems, some risers can be used to extend a sub slab vacuum field though the fill material beneath the slab. Other risers on the same blower system may be used to induce an air exchange rate in an inaccessible crawlspace. In this case, airflow data from the crawlspace riser would be assigned priority to control the gate valve on the crawlspace riser and blower motor speed would be secondarily controlled by sub slab pressure differential data. A steady state of both airflow and vacuum would exist within different zones of a single system.

Further, in some multi-riser systems, prior to dynamic balancing, different sub slab vacuum levels will exist throughout the different riser zones of the system. The reason these disparities in radiuses of influence exist is because unless there is imported homogeneous sub slab fill, such as crushed stone, naturally occurring soils will have different levels of compaction and permeability as a result of the building construction process. In cases where the permeability of the sub slab material varies from zone to zone, blower motor control priority for sub slab vacuum can be assigned to the zone with the lowest pressure differential. To achieve maximum energy efficiency, electromechanically controlled gate valves will damper airflow yields from various other zones of the system until the sub slab vacuum fields throughout all zones have achieved the objective sub slab pressure differentials. Priority can remain with the zone that has the lowest vacuum and the control equipment can dynamically respond to maintain vacuum field parity and achieve pressure differential objectives in all zones.

In some embodiments, such as in FIG. 6, fresh outdoor air can be drawn into the sub slab to dilute soil vapor contaminant concentrations. An example would be in the case of methane or gasoline vapor intrusion where introduction fresh air would lower the overall contaminant concentrations and reduce the probability of flash or explosion. In this case, the initial activation or turning on of the blower motor 120 would be in response to exceeding a set point in a soil gas sensor 253 or riser pipe sensor 230. When the blower is actuated, the gate valve 280 can electromechanically open and the blower motor can draw fresh dilution air through the sub slab material until the lower threshold concentration limit at the sub slab sensor 253 nearest the riser contaminant sensor 230 is achieved. The data collection and processing system 240 controls the blower motor 210 to slow down such that the desired steady state contaminant concentration is maintained at a lower threshold limit measured by the riser contaminant sensor 230. Since multiple fresh air intake tubes 114 can be located on different sides of the building, the volume of inflowing air can be monitored by sensors 210 and may be electromechanically dampened by gate valves 210 to create a balanced inflow of fresh air in response to unequal pressures on the sides of a building. These positive and negative pressures outside of the building are usually induced by wind loading. Priority in fresh air introduction to the sub slab may be assigned manually by the operator depending on the location of the contaminant source relative to the building. An example of this would if there is a landfill that is producing methane gas in the sub surface soil behind a building then the fresh air intake valves 280 closest to the source may be open to a greater degree to facilitate the introduction of a greater volume of fresh air to lower overall sub slab contaminant concentrations and potential for explosion. In these cases, using embedded sensor data, priority may be assigned in a descending hierarchy from vacuum at the outer extension of the pressure field sub slab 160c, vacuum 225 or air flow 210 in the fresh air inflow tube 114 or mass airflow 210 in the riser. This hierarchy of control logic will be determined and initially set by the operator because it is important to achieve a steady state of pressures without mining contaminants from outside the buildings foot print. Additionally fresh outside air may be inducted into the sub slab for the purpose of drawing that air through the system and cooling the motor assembly. After hierarchy of control has been set by the operator, dynamic functions controlled by the processing circuitry 240 and the web interface 170, 172 and 174 would maintain the automated monitoring and management functions.

Performance set points and priority can be assigned to any one of the above mentioned sensors, valves or motors, and can be set or monitored onsite or through an off-site monitoring service system. The user interface 500 allows for user to review, adjust and/or monitor performance set points, priority and system performance.

The user interface 500 includes an environmental display area 520, a system operation selection interface area 530, and energy consumption and savings display area 540, and a system configuration diagram having a main riser display area 545 and zone riser display area 550. The environmental display area 520 may display one or more of the following measurements: exterior temperature, wind direction, wind speed, air pressure and humidity. The measurements displayed in the environmental display area 520 may be captured by the environmental sensors 160(e) shown in FIGS. 2, 3 and 8.

The system operation selection interface area 530 includes options for selecting an operational mode a vapor mitigation system. In some embodiments, a vapor mitigation system can be configured in one of three operational modes: a manual cloud based control mode, an automatic dynamic control mode, and an off mode. Selecting "Manual Cloud Based Control" allows the user to manually control the blower speed. Selecting "Off" turns the blower off, transitions the system to passive mode while maintaining the monitoring capabilities. Selecting "Automatic Dynamic Control" configures/controls the vapor mitigation system to enter a closed loop configuration where it will function according to the user defined set points.

The energy consumption and savings display area 540 may display energy consumption and operating statistics of a vapor mitigation system. In the present exemplary embodiment, the energy consumption and savings display area 540 displays a starting date for used in the energy consumption calculations (e.g., "Jan. 1, 2013"), electricity cost (e.g., "$0.18 KWH"), the number of days the system has been running (e.g., "45"), power consumed by blower (e.g., "966"), power saved (e.g., "1451"), and cost savings (e.g., "$261.12"). The display may also be configured to display power consumed to-date. Also, the report data can be configured to a format that is convenient to the client. For example, the power consumed in a specific month or quarter or year.

The main riser display area 545 includes a main riser airflow display area 545a, a main riser vacuum display area 545b, a blower current display area 545c and a main riser contaminant display area 545d. The main riser airflow display area 545a includes an airflow measurement display field 545a1 for displaying an airflow measurement (e.g., "123" CFM) within the main riser pipe of a selected vapor mitigation system. The measurement displayed in the airflow measurement display field 545a1 may be captured by the mass airflow sensor 140 coupled to the main riser piper 110mr shown in FIGS. 2, 3 and 4. The main riser airflow display area 545a further includes a main riser airflow set point field 545a2 and a main riser airflow alert set point field 545a3. The main riser airflow set point field 545a2 allows a user to enter a value (e.g., "0") for a user defined set point, and the main riser airflow alert set point field 545a3 allows a user to enter a value (e.g., "50") for a user defined notification point.

The main riser vacuum display area 545b includes a vacuum measurement display field 545b1 for displaying a vacuum pressure measurement (e.g., "15" inch WC) within the main riser pipe of a selected vapor mitigation system. The measurement displayed in the vacuum measurement display field 545b1 may be captured by the vacuum/pressure sensor 132 coupled to the main riser piper 110mr shown in FIGS. 2, 3 and 4. The main riser vacuum display area 545b further includes a main riser vacuum set point field 545b2 and a main riser vacuum alert set point field 545b3. The main riser vacuum set point field 545b2 allows a user to enter a value (e.g., "0") for a user defined set point, and the main riser vacuum alert set point field 545b3 allows a user to enter a value (e.g., "10") for a user defined notification point.

The blower current display area 545c includes a blower current display field 545c1 for displaying a blower current measurement (e.g., 6 amps). The blower current display area further includes a blower current alert set point field 545c2, which allows a user to enter a value (e.g., "10" amps) for a user defined notification point. Alerts can be sent out to notify the manger of high and/or low power consumption events.

The main riser contaminant display area 545*d* includes a contaminant concentration measurement display field 545*d*1 for displaying a contaminant concentration measurement (e.g., "14" ppm) within the main riser pipe of a selected vapor mitigation system. The measurement displayed in the contaminant concentration measurement display field 545*d*1 may be captured by the contaminant sensor 160*d* coupled to the main riser piper 110*mr* shown in FIGS. 2, 3 and 4. The main riser contaminant display area 545*d* further includes a main riser contaminant concentration set point field 545*d*2 and a main riser contaminant concentration alert set point field 545*d*3. The main riser contaminant concentration set point field 545*d*2 allows a user to enter a value (e.g., "1") for a user defined set point, and the main riser contaminant concentration alert set point field 545*d*3 allows a user to enter a value (e.g., "20") for a user defined notification point.

The zone riser display area 550 includes groups of measurement and input fields for each zone Zb1, Zb2, Zb3 of the vapor mitigation system. The groups of measurement and input fields includes a gate valve display area 551*a*, 552*a*, 553*a*, a zone riser airflow display area 5551*b*, 552*b*, 553*b*, a zone riser vacuum display area 551*c*, 552*c*, 553*c*, a zone riser contaminant display area 551*d*, 552*d*, 553*d*, and a zone sub-slab vacuum display area 551*e*, 552*e*, 553*e*. The gate valve display area 551*a* includes a gate valve position display 551*a*1 for displaying a value (e.g., "36") representing the gate valve percentage closed. The gate valve display area 551*a* further includes a gate valve set point field 551*a*2, which allows a user to enter a value (e.g., "25") for a user defined set point in terms of percentage open.

The zone riser airflow display area 551*b* includes an airflow measurement display field 551*b*1 for displaying an airflow measurement (e.g., "47" CFM) within the zone riser pipe of a selected vapor mitigation system. The measurement displayed in the airflow measurement display field 551*b*1 may be captured by the mass airflow sensor 140 coupled to the zone riser piper 110*zr* shown in FIGS. 2, 3 and 4. The zone riser airflow display area 551*b* further includes a zone riser airflow set point field 551*b*2 and a zone riser airflow alert set point field 551*b*3. The zone riser airflow set point field 551*b*2 allows a user to enter a value (e.g., "46" CFM) for a user defined set point, and the zone riser airflow alert set point field 551*b*3 allows a user to enter a value (e.g., "5") for a user defined notification point.

The zone riser vacuum display area 551*c* includes a vacuum measurement display field 551*c*1 for displaying a vacuum pressure measurement (e.g., "1" inch WC) within the zone riser pipe of a selected vapor mitigation system. The measurement displayed in the vacuum measurement display field 551*c*1 may be captured by the vacuum/pressure sensor 132 coupled to the zone riser piper 110*zr* shown in FIGS. 2, 3 and 4. The zone riser vacuum display area 551*c* further includes a zone riser vacuum set point field 551*c*2 and a zone riser vacuum alert set point field 551*c*3. The zone riser vacuum set point field 551*c*2 allows a user to enter a value (e.g., "1.38") for a user defined notification point, and the zone riser vacuum alert set point field 551*c*3 allows a user to enter a value (e.g., "0.75") for a user defined notification point.

The zone riser contaminant display area 551*d* includes a contaminant concentration measurement display field 551*d*1 for displaying a contaminant concentration measurement (e.g., "5" ppm) within the main riser pipe of a selected vapor mitigation system. The measurement displayed in the contaminant concentration measurement display field 551*d*1 may be captured by the contaminant sensor 160*d* coupled to the zone riser piper 110*zr* shown in FIGS. 2, 3 and 4. The zone riser contaminant display area 551*d* further includes a zone riser contaminant concentration set point field 551*d*2 and a zone riser contaminant concentration alert set point field 551*d*3. The zone riser contaminant concentration set point field 551*d*2 allows a user to enter a value (e.g., "3" ppm) for a user defined notification point, and the zone riser contaminant concentration alert set point field 551*d*3 allows a user to enter a value (e.g., "2" ppm) for a user defined notification point.

The zone sub-slab vacuum display area 551*e* includes a vacuum measurement display field 551*e*1 for displaying a vacuum pressure measurement (e.g., "0.0126" inch WC) within the sub-slab of building or structure. The measurement displayed in the vacuum measurement display field 551*e*1 may be captured by the zone vacuum sensor 160*c* shown in FIGS. 2, 3 and 4. The zone sub-slab vacuum display area 551*e* further includes a zone sub-slab vacuum set point field 551*e*2 and a zone sub-slab vacuum alert set point field 551*e*3. The zone sub-slab vacuum set point field 551*e*2 allows a user to enter a value (e.g., "0.0080 in wc") for a user defined notification point, and the zone sub-slab vacuum alert set point field 551*e*3 allows a user to enter a value (e.g., "0.0025 in wc") for a user defined notification point.

Figure 12A:
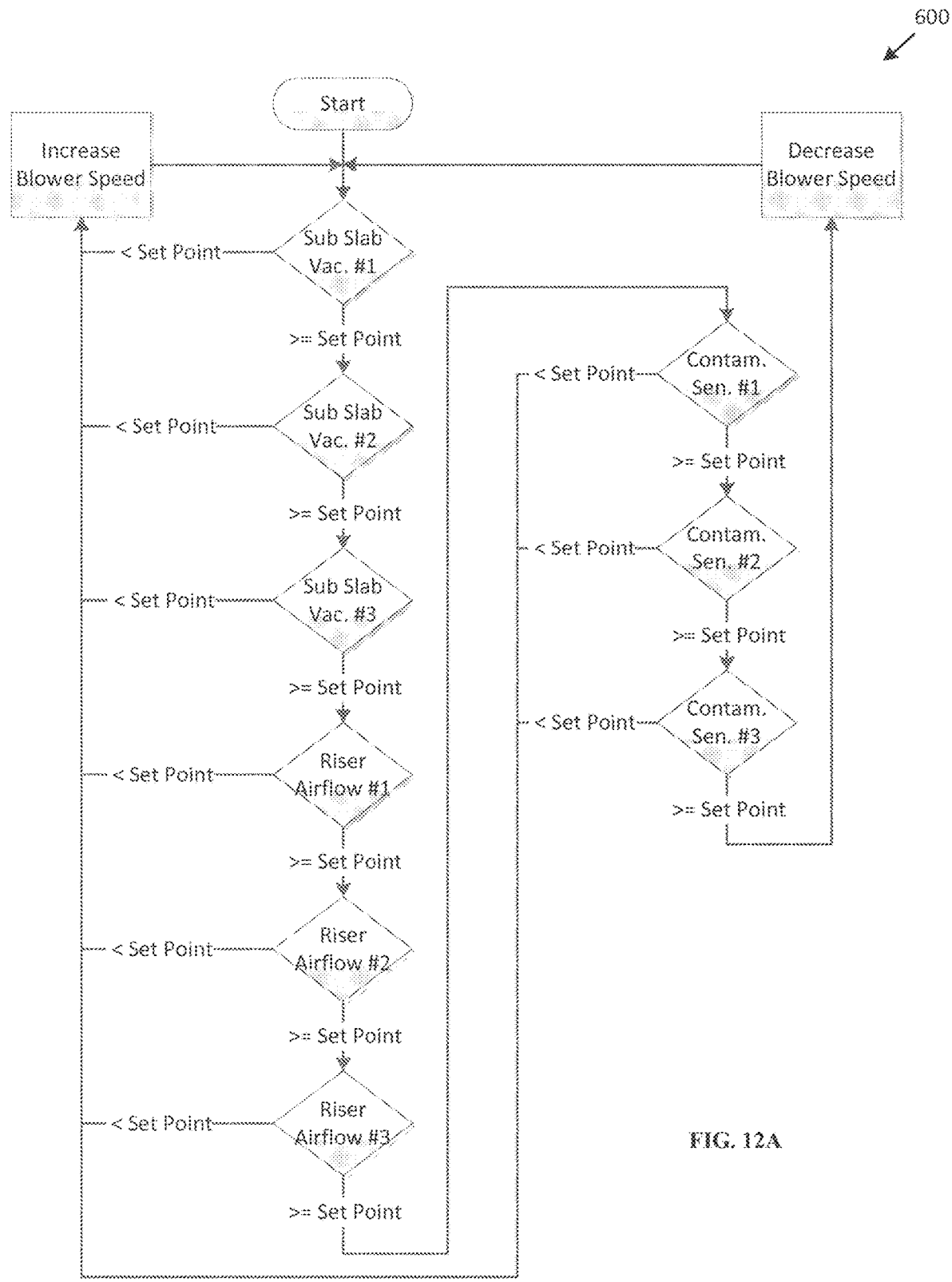
FIGS. 12A and 12B are flow diagrams illustrating methods of controlling a vapor mitigation system.

FIG. 12A is a flow diagram illustrating a method of controlling a vapor mitigation system. The flow diagram illustrates a method 600 of controlling a vapor mitigation system. The present embodiment illustrates a method of controlling the second vapor mitigation system 100*b* (three zone system Zb1, Zb2, Zb3) shown in FIG. 10.

In the present embodiment, the system checks the sensors associated with the vapor mitigation system in the order that sensor priority is assigned by the operator who enters the set points. Each sensor can include a high set point and low set point that corresponds with desired performance threshold limits. Alternatively, each sensor can include a single set point. Depending on the performance objective of the system, priority can be assigned to any sensor in any order on any riser or sub-riser. Alternatively, no priority can be assigned to selected sensors. In some embodiments, when no range or priority is assigned the sensor will transmit a measured value such as 3% methane. To disengage a sensor from the control loop so that the signal produced by the sensor will not influence the blower motor or riser gate valves the operator or user can set the set point to zero. The sensors can include any of the sensors described herein.

In the present embodiment, the system checks all of the sensors for which set points have been entered. If the measured value exceeds the set point values the motor speed is reduced by a predetermined value. For example, if the measured value of all of the set point values are exceeded the motor speed is reduced by 1% until the upper set point values are met. The system also checks all of the sensors for which the lower threshold limits set points have been entered. If the lower threshold of a set point on any sensor for which thresholds have been set is not achieved the motor speed is increased by a predetermined value. For example, if the lower threshold of set point is not achieved the motor speed is increased by 1% until the entered threshold performance limit is met.

In the present embodiment, once measured sensor values match a set point such as in the case of sub slab vacuum, the system continues to monitor sensor transmissions and makes minor adjustments in power to the motor. The frequency in which power to the motor is altered in response to sensor output can vary depending on site conditions such as soil permeability and airflow yields. Response time in making control adjustments, motor speed or flow dampening through valves can range, for example, from 100 milliseconds up to 30 seconds or more. The delay time is site specific and programming adjustments are made as part of system start up and balancing.

Figure 12B:
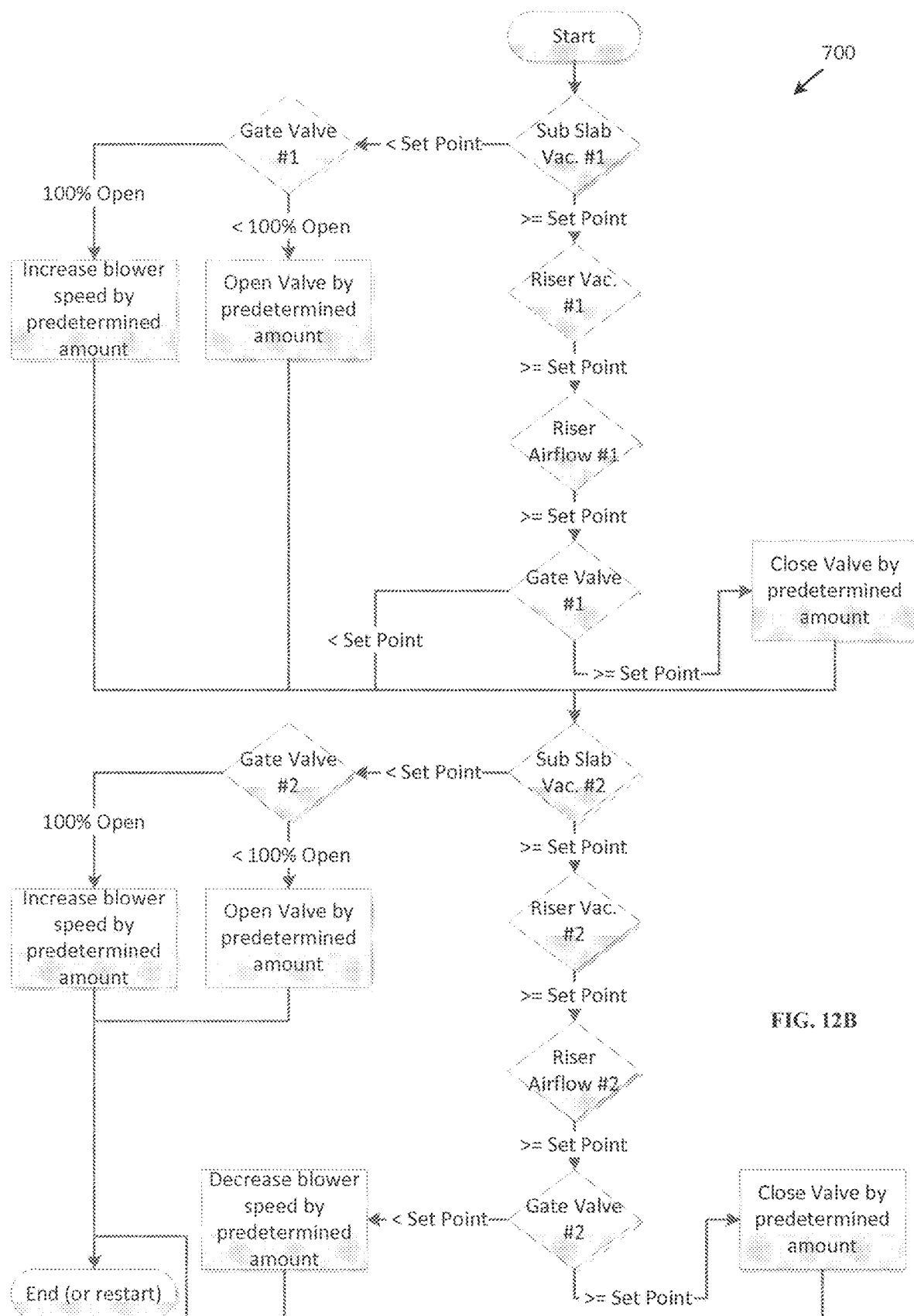
Figure 13F:
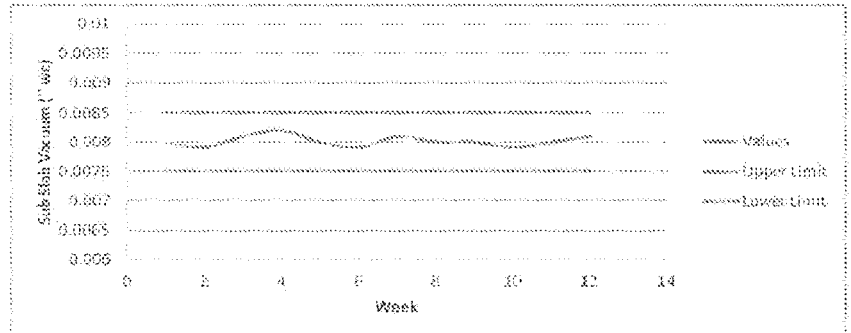

FIG. 12B is a flow diagram illustrating a method of controlling a vapor mitigation system. The flow diagram illustrates a method 700 of controlling a vapor mitigation system. The present embodiment illustrates a method of controlling the vapor mitigation system configured with two sub-risers.

In the present embodiment, multi riser systems performance can be further refined by manually or electro mechanically controlling gate valves of the sub-risers. The system can be configured to evaluate the sensor data from monitored sites throughout the system. For example if all sub slab sensors are set to have a minimum performance vacuum of 0.008 inches water column (w.c.) and that objective is achieved though controlling motor speed than the lowest performing riser zone, usually the zone with the lowest permeable soil will always have a minimum of 0.008 inches w.c. as controlled by the speed of the motor. Because the vacuum that is transferred throughout the main conveyance pipe is basically the same minus drag variables that are unique to the piping arrangement different sub slab riser zones sensors will measure different amounts of vacuum. If it has been established that 0.008 inches w.c is sufficient to prevent the flow of harmful vapors from the soil to the occupied space and certain riser zones have vacuum that exceeds 0.008 w.c than system inefficiencies exist that contribute to excess energy consumption. To overcome those inefficiencies the riser valves on the zones with excessive sub slab vacuum would close in a predetermined amount (for example, 1%) until a sub slab vacuum level in that zone is achieved.

If building pressure variables were to change any of the sensor values indicated less than the set point for that sensor then the valve position is opened by a predetermined amount (for example, 1%). If the valve position is 100% open and the performance objective is not achieved then the blower speed is increased by a predetermined amount (for example, 1%) until performance objectives are achieved. If conditions change and all of indicated values are more than the set point values for each sensor then the valve position is closed by a predetermined amount (for example, 1%). In some embodiments, no gate valve shall be more than 90% closed unless manually set by the system operator. This will repeat for all risers. If the value of every sensor on every riser is greater than the set point for that sensor and all of the valves are 90% closed then the blower speed is decreased by a predetermined amount (for example, 1%).

FIGS. 13A-13F is an exemplary report describing performance metrics of a vapor mitigation system. The vapor mitigation system 100 or the monitoring service system 440 may generate a report 600 providing performance metrics. The report may include a cover page (FIG. 12A), a Table of Contents page (FIG. 12B) and one or pages describing the performance of a vapor mitigation system (FIGS. 12C-12F). The report 600 may be generated on a quarterly basis ($1^{st}$ quarter, $2^{nd}$ quarter, $3^{rd}$ quarter, $4^{th}$ quarter), a monthly basis, a weekly basis, or on-demand. The report can be retrieved by accessing the user interface of the vapor mitigation system 100 or monitoring service system 440. Alternatively or additionally, the report can be transmitted by electronic mail (e-mail) to a user by the vapor mitigation system 100 or monitoring service system 440.

While the present inventive concepts have been particularly shown and described above with reference to exemplary embodiments thereof, it will be understood by those of ordinary skill in the art, that various changes in form and detail can be made without departing from the spirit and scope of the present inventive concepts described above and defined by the following claims.

What is claimed is:

1. A vapor management system, comprising:
    a monitoring service system comprising a CPU, memory, and a subsystem for transmitting and/or receiving data;
    wherein the monitoring service system is configured to (i) monitor a contaminant concentration in a region beneath a building and (ii) receive one or more adjustable vacuum set points from at least one vapor mitigation system,
    wherein the monitoring service system is further configured to receive an alarm notification parameter from the at least one vapor mitigation system and generate an alarm notification when the one or more adjustable vacuum set points have passed a predetermined level.

2. The vapor management system of claim 1, wherein the monitoring service system is further configured to generate a user interface, the user interface configured to display and permit adjustment of the one or more adjustable vacuum set points.

3. The vapor management system of claim 1, wherein the alarm includes an email notification.

4. The vapor management system of claim 1, further comprising a controller configured to transmit the one or more adjustable vacuum set points to the monitoring service system.

5. A method of monitoring a vapor mitigation system, comprising:
    monitoring a contaminant concentration, detected by the vapor mitigation system, in a region beneath a building;
    receiving an adjustable vacuum set point from the vapor mitigation system;
    receiving an alarm notification parameter from the vapor mitigation system; and
    generating an alarm notification indicating that the adjustable vacuum set point has passed a predetermined level.

6. The method of claim 5, wherein generating the alarm notification includes generating an email notification.

7. The method of claim 5, further comprising displaying the vacuum set point on a user interface.

8. The method of claim 5, further comprising generating a performance metrics report.

9. The method of claim 5, further comprising:
    receiving one or more system parameters from a client device; and
    transmitting the one or more system parameters to the vapor mitigation system.

10. The method of claim 9, wherein the alarm notification parameter is generated when one or more system performance measures are less than a predetermined level.

11. The method of claim 5, wherein the alarm notification parameter is generated when one or more system performance measures are less than a predetermined level.

* * * * *